United States Patent [19]

Kappelt et al.

[11] Patent Number: 4,655,089

[45] Date of Patent: Apr. 7, 1987

[54] MASS FLOW METER AND SIGNAL PROCESSING SYSTEM

[75] Inventors: Eric G. Kappelt, Fairview; Frederick A. Ciccozzi, Erie, both of Pa.

[73] Assignee: Smith Meter Inc., Erie, Pa.

[21] Appl. No.: 797,980

[22] Filed: Nov. 14, 1985

Related U.S. Application Data

[63] Continuation-in-part of Ser. No. 742,567, Jun. 7, 1985, abandoned.

[51] Int. Cl.$^4$ .............................................. G01F 1/84
[52] U.S. Cl. .................................................. 73/861.38
[58] Field of Search ............ 73/861.27, 861.28, 861.38

[56] References Cited

U.S. PATENT DOCUMENTS

| Re. 31,450 | 11/1983 | Smith ............................ 73/861.38 |
| 3,355,944 | 12/1967 | Sipin . |
| 3,485,098 | 12/1969 | Sipin . |
| 3,624,274 | 11/1971 | Araki et al. .................... 307/511 X |
| 3,839,915 | 10/1974 | Schlitt . |
| 3,861,220 | 1/1975 | Felsenthal, Jr. . |
| 3,889,186 | 6/1975 | Larson ............................. 324/83 D |
| 3,927,565 | 12/1975 | Pavlin et al. . |
| 3,989,931 | 11/1976 | Phillips . |
| 4,066,952 | 1/1978 | Ley .................................. 324/83 D |
| 4,069,713 | 1/1978 | Gussmann ...................... 73/861.28 |
| 4,109,524 | 8/1978 | Smith . |
| 4,127,028 | 11/1978 | Cox et al. ....................... 73/861.38 |
| 4,144,572 | 3/1979 | Starner et al. .................. 364/487 |
| 4,187,721 | 2/1980 | Smith . |
| 4,192,184 | 3/1980 | Cox et al. . |
| 4,252,028 | 2/1981 | Smith et al. .................... 73/861.38 |
| 4,311,054 | 1/1982 | Cox et al. ........................ 73/861.38 |
| 4,381,672 | 5/1983 | O'Connor et al. ............. 73/505 |
| 4,381,680 | 5/1983 | Shiota ............................. 73/861.38 |
| 4,400,664 | 8/1983 | Moore ............................. 324/83 D |
| 4,420,983 | 12/1983 | Langdon ......................... 73/861.18 |
| 4,422,338 | 12/1983 | Smith .............................. 73/861.38 |
| 4,438,393 | 3/1984 | Moskalik et al. ............... 324/83 D |
| 4,444,059 | 4/1984 | Smith .............................. 73/861.37 |
| 4,445,224 | 4/1984 | Ihira et al. ...................... 375/120 |
| 4,491,025 | 1/1985 | Smith et al. .................... 73/861.38 |
| 4,522,062 | 6/1985 | Peters ............................. 73/505 |
| 4,559,833 | 12/1985 | Sipin .............................. 73/861.38 |

FOREIGN PATENT DOCUMENTS

| 0153121 | 9/1983 | Japan . |
| 0156813 | 9/1983 | Japan . |
| 0206925 | 12/1983 | Japan . |
| 0206926 | 12/1983 | Japan . |

Primary Examiner—Herbert Goldstein
Attorney, Agent, or Firm—Andrew J. Cornelius

[57] ABSTRACT

A signal processing system that directly determines the phase difference existing between two periodic electrical signals and a mass flow meter employing the system are provided. The system shifts together two comparison signals corresponding to the periodic electrical signals and accumulates the shift that is necessary to force the phase angles of the comparison signals to be equal. The mass flow meter employs a moving conduit through which the fluid whose mass flow rate is to be measured flows and which generates Coriolis forces. The Coriolis forces affect the motion of the moving conduit and motion sensors provide periodic signals corresponding to the motion of the conduit. Under flow conditions, the Coriolis forces cause the electrical signals produced by the sensors to be out of phase with each other to an extent that depends on the magnitude of the mass flow rate. The system provided by the invention is employed by the meter to measure the phase difference between the electrical signals to provide an indication of the mass flow rate through the moving conduit.

7 Claims, 32 Drawing Figures

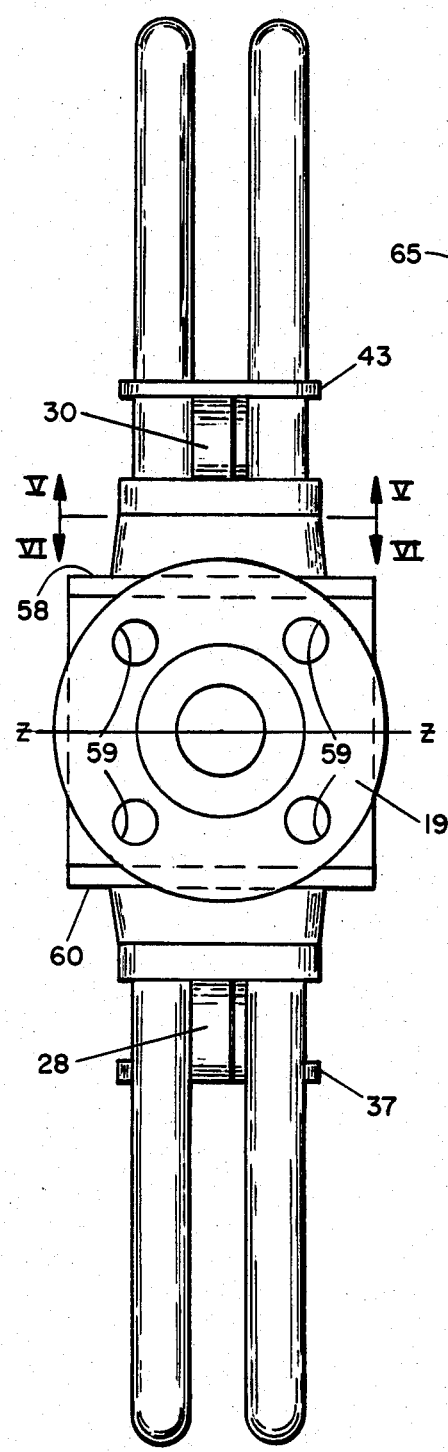
FIG. 2
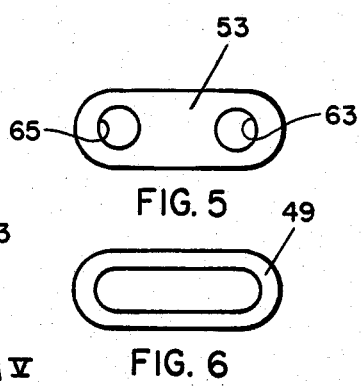
FIG. 5
FIG. 6
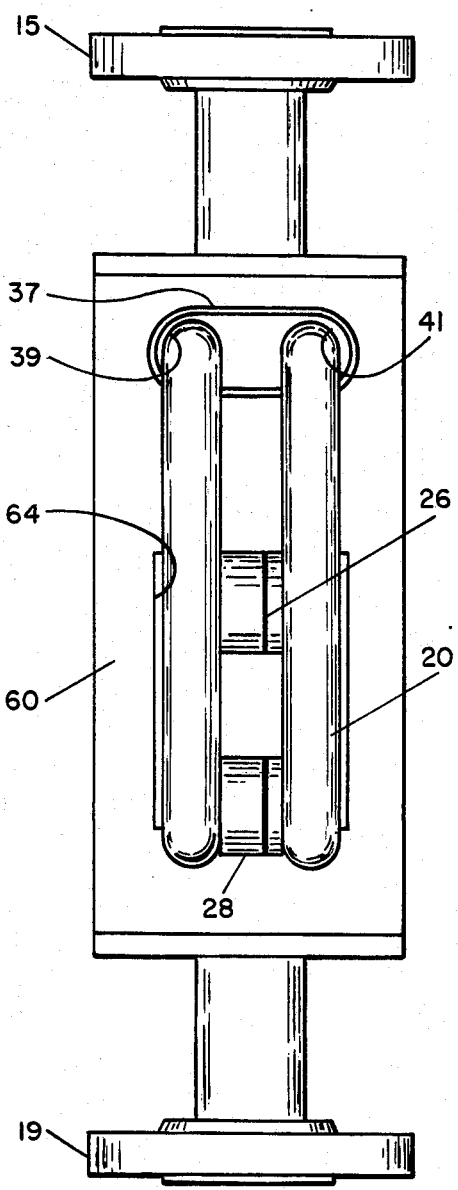
FIG. 3

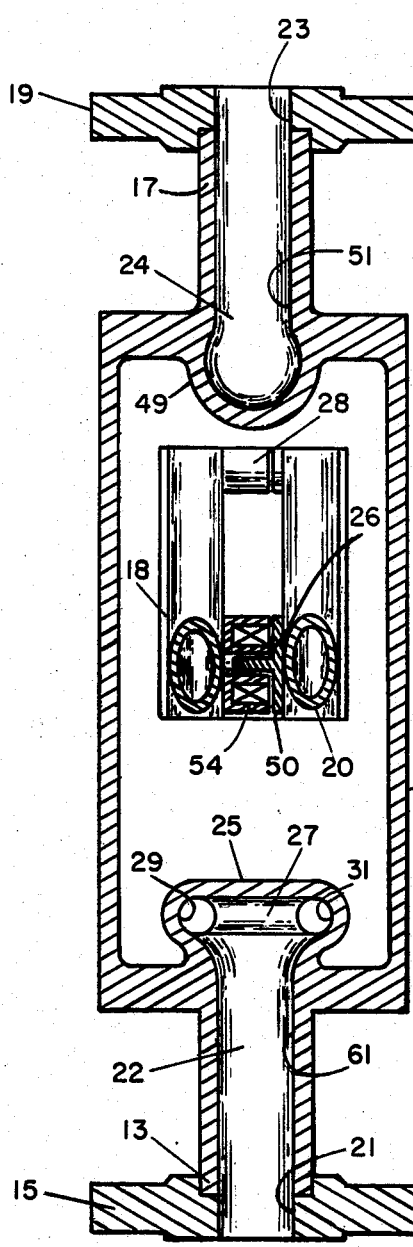
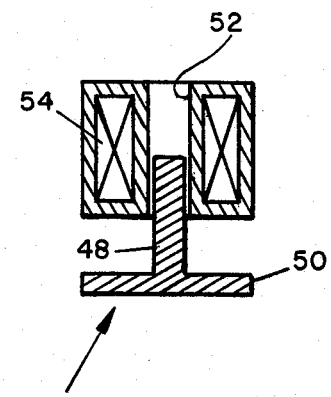
FIG. 4
FIG. 7

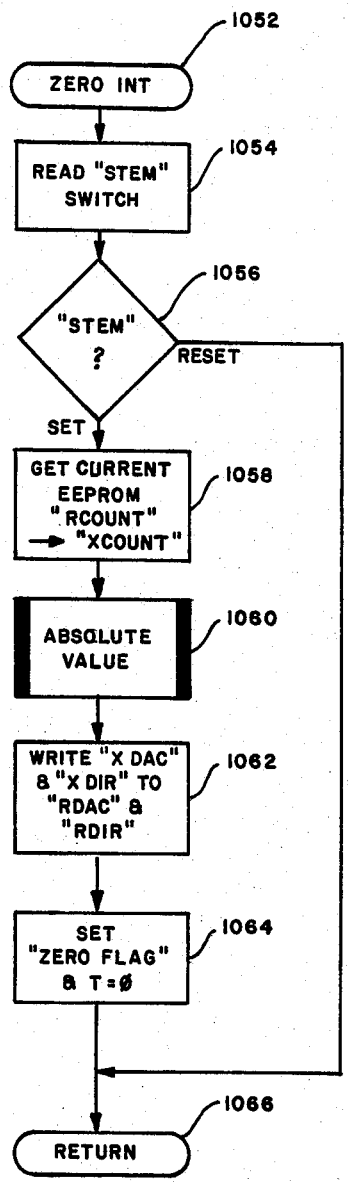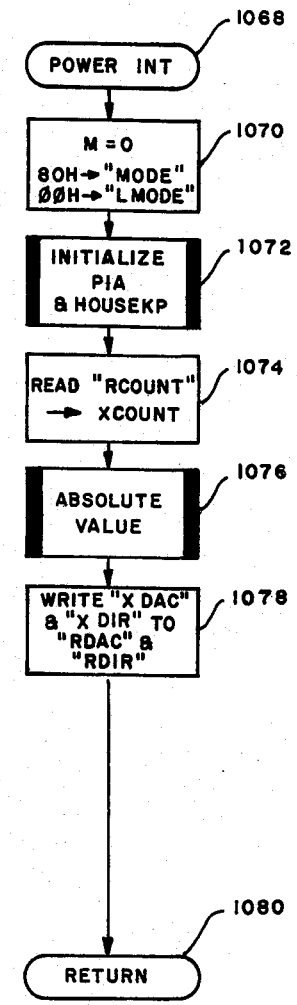
MASS METER: ZERO INTERRUPT
MASS METER: POWER INTERRUPT
FIG. 22
FIG. 23

MASS METER: ABSOLUTE VALUE SUBROUTINE.

MASS METER: MASS SUBROUTINE

MASS METER: CUTOFF SUBROUTINE

MASS FLOW METER AND SIGNAL PROCESSING SYSTEM

CROSS REFERENCE TO RELATED APPLICATION

The present application is a continuation-in-part of application for U.S. Ser. No. 742,567, filed June 7, 1985, which is now abandoned.

FIELD OF THE INVENTION

The present invention relates generally to the measurement of the mass flow rate of fluids and, more particularly, to a signal processing system for a mass flow meter and a mass flow meter that employs the signal processing system.

DESCRIPTION OF THE PRIOR ART

Often, the rate at which material flows through a supply line must be determined with the greatest possible accuracy. For example, the actual mass or volume of material transferred to a buyer of the material is determined by a meter that measures the mass or volume of material that flows from the seller's reservoir of material to the buyer's container. A meter that inaccurately determines the mass or volume of material that is transferred to the buyer will cause an adverse impact on the seller or the buyer. Further, the mass flow rate of material that is produced for human consumption is most desirably determined by a meter that is placed in the line that carries the material and that places no obstruction which could contaminate the material, in the path of the flow of the material.

One type of mass flow meter that satisfies the requirements described above employs a moving conduit that is placed in the line that carries fluid whose mass flow rate is to be measured, and is often referred to as a "vibratory" or "Coriolis force" meter. The concurrent movement of the fluid in the conduit and the vibration of the conduit itself generate forces that are exerted on and deform the conduit. The magnitude of the forces, one of which is Coriolis force, is related to the mass flow rate of the fluid in the conduit. Therefore, by measuring the magnitude of the force, or by measuring a characteristic of the conduit or its movement that is affected by the force, a determination of the mass flow rate of the fluid can be made. The following U.S. patents disclose vibratory mass flow meters that employ conduits of various shapes and signal processing systems of various types:

U.S. Pat. No. 3,485,098
U.S. Pat. No. 4,109,524
U.S. Pat. No. 4,127,028
U.S. Pat. No. 4,192,184
U.S. Pat. No. 4,252,028
U.S. Pat. No. 4,311,054
U.S. Pat. No. Re. 31,450
U.S. Pat. No. 4,422,338
U.S. Pat. No. 4,444,059
U.S. Pat. No. 4,491,025

Each meter identified above employs sensors that produce electrical signals that are related to the motion of the conduit at two points. The points are so chosen that there exists a phase and time difference between the two signals, ideally zero, when the mass flow rate of the fluid is zero, and a phase and time difference that varies from the no flow difference to an extent that is related to the mass flow rate of the fluid. Generally, the motion of the conduit at three selected points can be expressed as follows:

$$Z(A) = Z_A \sin(wt) \quad (1)$$

$$Z(D) = Z_D \sin(wt) \quad (2)$$

$$Z(B) = Z_B \sin(wt) \quad (3)$$

when the meter is under a no flow condition, where:
A and B identify the two sensing points on the conduit at which movement sensors are located;
D identifies the driving point of the conduit at which driving force is applied to the conduit to vibrate it;
Z(A) and Z(B) represent the displacement, or position, of the two points A and B at time t;
Z(D) is the position or displacement of the conduit at the driving point D;
$Z_A$, $Z_D$ and $Z_B$ represent the maximum displacement from rest of points A, D and B;
t is time in seconds; and
w is the frequency of the driving force in radians/second.

When fluid is flowing through the conduit equations (1), (2) and (3) become:

$$Z(A) = Z_A \sin[wt + f(M)] \quad (4)$$

$$Z(D) = Z_D \sin[wt] \quad (5)$$

$$Z(B) = Z_B \sin[wt - f(M)] \quad (6)$$

where f(M) represents the mathematical expression of angular phase difference, in terms of mass flow rate. Known meters often use position sensors to convert the motion of the vibrating conduit, at points A and B, to electrical signals, which can be expressed by the following:

$$V_1 = V_{PA} \sin[wt + f(M)] \quad (7)$$

$$V_2 = V_{PB} \sin(wt - f(M)) \quad (8)$$

where $V_1$ and $V_2$ represent the voltage corresponding to movement of the vibrating conduit, and $V_{PA}$ and $V_{PB}$ are the peak voltages of the electrical signals, which correspond to the maximum displacement of the conduit at points A and B. Graphic representations of $V_1$ and $V_2$ are provided by FIG. 18. It should be noted that velocity or acceleration sensors are employed sometimes to detect conduit movement. Velocity and acceleration sensors produce signals that are expressed by appropriate derivatives of equations (7) and (8) with respect to time.

Therefore, mass flow rate information is contained, as phase information, in the argument of each of equations (7) and (8). The magnitude of the peak voltage for velocity and acceleration sensors is dependent on the frequency of the driving force.

Known vibratory mass flow meters generally use either a differential amplifier technique or a time differencing technique to extract mass flow rate information from equations (7) and (8). Employing the differential amplifier technique involves transmitting voltages $V_1$ and $V_2$ to a differential amplifier, which forms the difference between $V_1$ and $V_2$ as follows:

$$V_1 - V_2 = V_{PA} \sin[wt + f(M)] - V_{PB} \sin[wt - f(M)] \quad (9)$$

By using the appropriate trigonometric identities, equation (9) becomes:

$$V_1 - V_2 = (V_{PA} - V_{PB})[\cos f(M)]\sin wt + (V_{PA} + V_{PB})[\sin f(M)]\cos wt \quad (10)$$

By adjusting the gains associated with each position sensor, thereby setting $V_{PA}$ equal to $V_{PB}$, equation (1) reduces to:

$$V_1 - V_2 = 2V_{PA}[\sin f(M)]\cos wt \quad (11)$$

If the maximum value of f(M) is small, less than about two degrees, then sin f(M) is approximately equal to f(M) and equation (11) becomes:

$$V_1 - V_2 = 2V_{PA} f(M) \cos wt \quad (12)$$

There are several disadvantages associated with the use of the differential amplifier technique. First, the output of the differential amplifier is in analog form, which makes interfacing with digital equipment a problem. Second, a vibratory mass flow meter that employs the differential amplifier technique will introduce at least some inaccuracy into equation (12) if it produces a value for f(M) that exceeds about 3 degrees. Further, the value of the difference between $V_1$ and $V_2$ and, hence, the calculated mass flow rate, is dependent on the amplitude of vibration of the vibrating conduit and to the gain constants of the position sensors.

Employing the time differencing technique involves the use of a pair of voltage comparators A and B of the type shown in FIG. 19. Comparator A receives at its noninverting terminal input voltage $V_1$ and at its inverting terminal the threshold voltage $V_{TA}$. Comparator B receives at its noninverting terminal input voltage $V_2$ and at its inverting terminal the threshold voltage $V_{TA}$. Each comparator produces a high signal when the input voltage exceeds the threshold voltage and a low signal when the threshold voltage exceeds the input voltage. The electrical signals $V_1$ and $V_2$ produced by the motion sensors and the threshold voltages $V_{TA}$ and $V_{TB}$ are shown in FIG. 20(a). The signals, $C_x$ and $C_y$, that are produced by comparators A and B are shown in FIG. 20(b). The time differencing technique measures the difference in time between the occurrence of a pair of edges for each cycle of $C_x$ and $C_y$, as is shown in FIG. 20(b). When using the time differencing technique, equations (7) and (8) become:

$$V_1 = V_{TA} = V_{PA} \sin[w(T_A) + f(M)] \quad (13)$$

$$V_2 = V_{TB} = V_{PB} \sin[w(T_B) - f(M)] \quad (14)$$

where $T_A$ represents the times at which $V_1$ is equal to $V_{TA}$, and $T_B$ represents the times at which $V_2$ is equal to $V_{TB}$. Solving for $T_A$ and $T_B$ yields:

$$T_A = [(\arcsin V_{TA}/V_{PA})/w - f(M)/w] \quad (15)$$

$$T_B = [(\arcsin V_{TB}/V_{PB})/w + f(M)/w] \quad (16)$$

Taking the difference between $T_A$ and $T_B$ yields:

$$T_B - T_A = 2f(M)/w + [(\arcsin V_{TB}/V_{PB}) + (\arcsin V_{TA}/V_{PA})]/w \quad (17)$$

Equation (17) shows that the time difference $(T_B - T_A)$ is directly proportional to a time term, f(M)/w, and a constant divided by the frequency of vibration, w. The time difference term $(T_B - T_A)$ is most commonly converted to a corresponding voltage by an analog or digital summation technique. The major disadvantage associated with the use of the time differencing technique is the dependence of the time difference on the frequency of vibration of the conduit, w. Variations in the density of the fluid flowing through the conduit and variations in the characteristics of the conduit due to temperature will cause changes in the frequency of vibration.

Accordingly, there exists a need for a mass flow meter that employs Coriolis force and that does not depend on the frequency or the amplitude of movement of the conduit to measure the mass flow rate of a flowing fluid. Further, there is a need for such a mass flow meter that produces a digital output that can be used conveniently by digital computing equipment.

SUMMARY OF THE INVENTION

The present invention provides a mass flow meter that includes a conduit mounted at its ends to a support, apparatus for vibrating the conduit, and apparatus for producing a pair of periodic electrical signals representative of a characteristic of the motion of the conduit at two predetermined points. The flow meter includes a system that provides an indication of the phase difference existing between the two periodic electrical signals. The system includes apparatus for producing a measurement comparison signal from a first of the periodic electrical signals and a measurement threshold signal. The phase difference between the measurement comparison signal and the first periodic signal depends on the level of the measurement threshold signal relative to the first periodic signal. The system includes apparatus for generating a measurement characteristic signal. The measurement characteristic signal is related to the peak amplitude of the first periodic signal. Apparatus is provided for creating a command signal, the nature of the command signal depending on whether the measurement comparison signal leads or lags a reference signal. The reference signal can be one of many types. Preferably, the reference signal is the second of the periodic electrical signals or a signal representative of the motion of the conduit at a predetermined point. Most preferably, however, the reference signal is derived from the second periodic signal in which case the producing apparatus further produces a reference comparison signal from the second periodic electrical signal and a reference threshold signal. Apparatus is provided for accumulating a count signal, the command signals determining when the level of the count signal is increased and decreased. Apparatus is provided for combining a signal corresponding to the count signal and the measurement characteristic signal to produce the measurement threshold signal.

The present invention further provides a mass flow meter having a conduit mounted at its ends to a support an apparatus for vibrating the conduit. Apparatus is provided for producing a pair of periodic electrical signals representative of a characteristic of the motion of the conduit at two predetermined points. The meter includes a system that provides an indication of the phase difference between the periodic electrical signals. The system includes apparatus for receiving the periodic signals and producing a comparison signal from at least a first of the periodic electrical signals. Apparatus is provided for shifting the comparison signal to decrease to a predetermined magnitude the phase difference between the comparison signal and a reference signal. Apparatus is provided for monitoring and accumulating the angle through which the comparison signal is shifted to reduce the phase difference to the predetermined magnitude, Accordingly, the accumulated angle provides an indication of the phase difference between the periodic electrical signals when the phase difference between the comparison and reference signals reaches the predetermined magnitude.

Preferably, the meter can compensate for mechanical and electrical noise occurring at zero flow to eliminate any offsets that would otherwise exist in the meter. Also preferably, the compensation is accomplished using a two-step procedure. First, a coarse adjustment is made followed by a fine adjustment of the system.

BRIEF DESCRIPTION OF THE DRAWINGS

The following detailed description of the preferred embodiments can be understood better if reference is made to the accompanying drawings, in which:

FIG. 2 is a front view of the sensing assembly shown in FIG. 1;

FIG. 3 is a bottom view of the sensing assembly shown in FIG. 1;

FIG. 4 is a section view of the sensing assembly shown in FIG. 1, taken along the line IV—IV;

FIG. 5 is a sectional view of the assembly shown in FIG. 2 taken along the line V—V;

FIG. 6 is a sectional view of the assembly shown in FIG. 2 taken along the line VI—VI;

FIG. 7 is a sectional view of a sensor and drive assembly of the assembly shown in FIG. 1;

FIGS. 21 through 30 are flow chart representations of a program that is particularly suitable for operating microprocessor 1000;

DETAILED DESCRIPTION OF THE PREFERRED EMBODIMENTS

Figure 1:
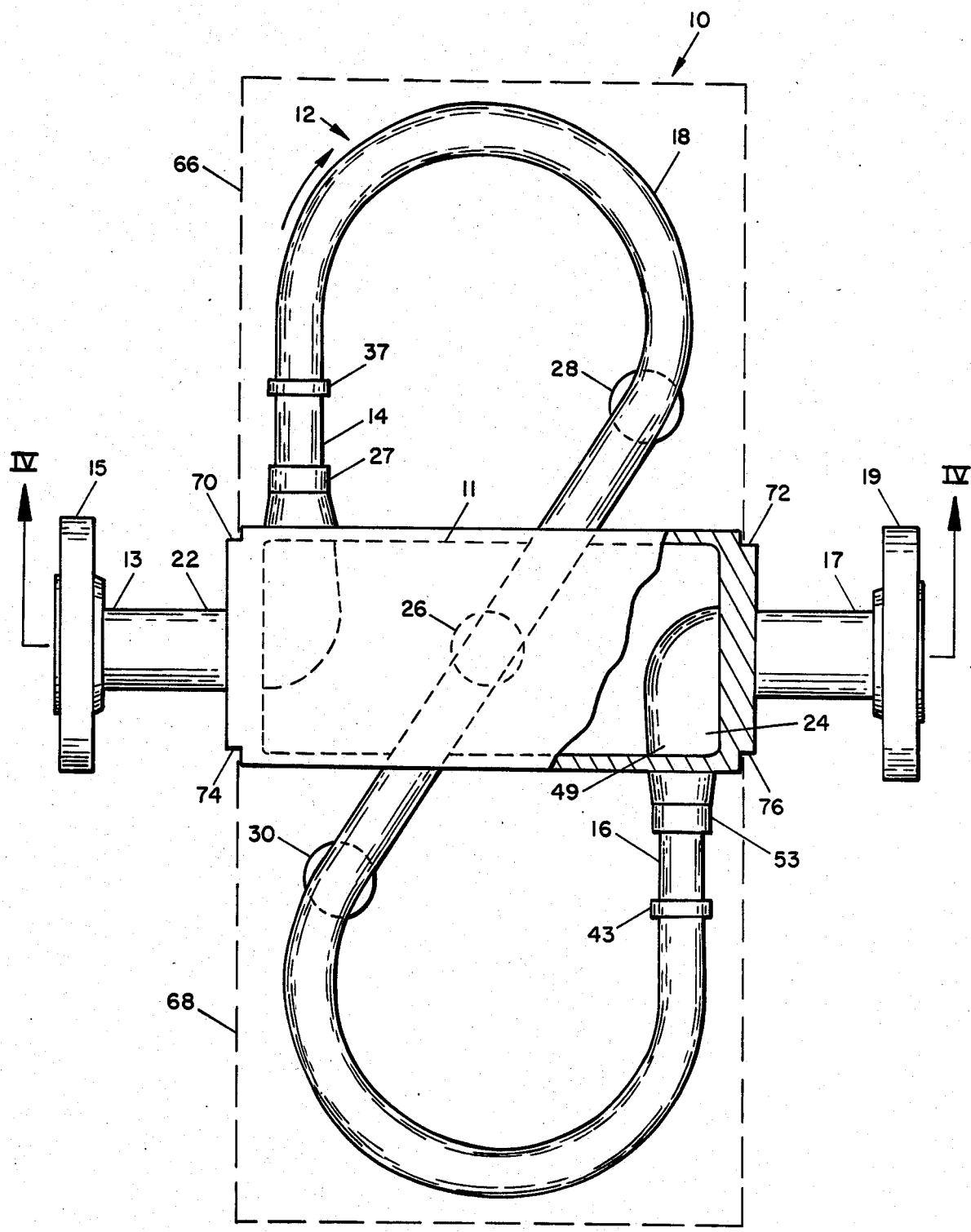
FIG. 1 is a side view of the sensing assembly of a preferred embodiment of the present invention, with the central body partially cut away.
Figure 8:
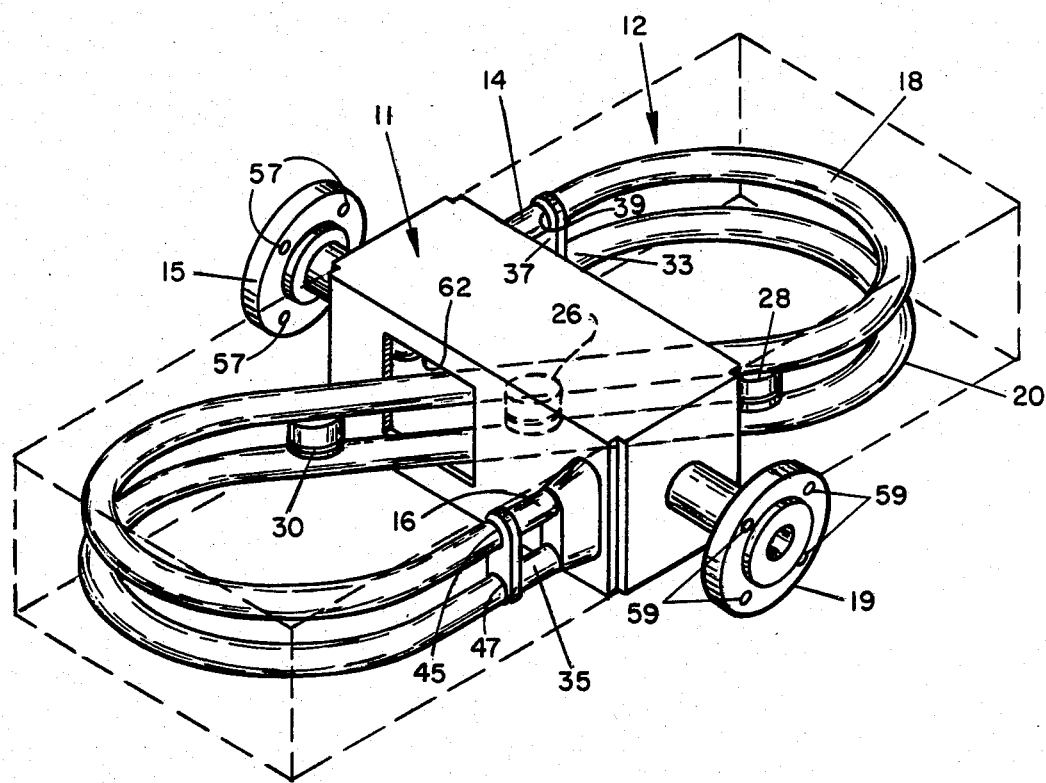
FIG. 8 is an isometric view of the assembly shown in FIG. 1.

The present invention provides a meter for measuring the mass flow rate of a fluid and a signal processing system that is particularly useful with mass flow meters. The preferred mass flow meter includes, generally, a sensing assembly, which produces a pair of electrical signals containing mass flow rate information, and a signal processing system that extracts the mass flow rate information from the signals produced by the sensing assembly.

FIGS. 1 through 8 show the sensing assembly 10 of the preferred meter of the present invention. Sensing assembly 10 is of the type disclosed and claimed in application for U.S. Letters Patent Ser. No. 655,305, filed Sept. 26, 1984, which is owned by the assignee hereof. However, a sensing assembly having any suitable conduit of any known shape can be used with the system provided by the present invention. Sensing assembly 10 includes a conduit 12 that defines conduit sections 18 and 20. Conduit section 18 defines an inlet 14 and an outlet 16. Conduit section 20 defines an inlet 33 and an outlet 35. A central body 11 defines a manifold section 22 that joins together and provides fluid communication between inlets 14 and 33 and the supply line (not shown) by means of a passage 61. Outlet manifold section 24 joins together and provides fluid communication between the supply line and outlets 16 and 35 by means of a passage 51. Manifold 22 defines an inlet 13 which can be placed in fluid communication with the supply line using a circular flange 15 and an outlet 25 through which fluid flows to reach conduit 12. Manifold 24 defines an inlet 49, which receives fluid from conduit 12 and an outlet 17 which can be placed in fluid communication with the supply line using circular flange 19. Flanges 15 and 19 define passages 21 and 23, respectively, that are adapted to receive fluid from the supply line, and bolt holes 57 and 59, respectively, which are adapted to receive the bolts (not shown) that secure the supply line to conduit 12. Passage 61 of manifold 22 is circular at inlet 13 to facilitate fluid flow from the supply line into manifold 22. Passage 61 is oval at outlet 25 of manifold 22 to facilitate the division of the fluid into two streams, each of which flows through a conduit section 18 or 20. A one-piece oval input casting 27 is sized to mate with outlet 25 of manifold 22. Casting 27 defines two passages 29 and 31, each of which is aligned with an inlet 14 or 33. Casting 27 is welded to outlet 25 of manifold 22 and to inlets 14 and 33 of conduit sections 18 and 20. Accordingly, casting 27 operates to split the fluid flowing through outlet 25 into two streams and to direct those streams through conduit sections 18 and 20. Passage 51 of manifold 24 has a circular cross section at outlet 17 to facilitate fluid flow between outlet 17 and the supply line. Passage 51 has an oval cross section at inlet 49 to facilitate fluid flow between conduit sections 18 and 20 and inlet 49. An oval outlet casting 53 defines a pair of openings 63 and 65, which are adapted to receive outlets 16 and 35 of conduit sections 18 and 20, respectively. An oval isolator 37 defines a passage 39 that receives conduit section 18 and a passage 41 that receives conduit section 20. An oval isolator 43 defines a pair of passages 45 and 47 that receive outlets 16 and 35 of conduit sections 18 and 20, respectively. Isolators 37 and 43 operate to limit vibration of conduit sections 18 and 20 to those portions located between isolators 37 and 43. Walls 58 and 60 of body 11 define rectangular openings 62 and 64, respectively, which receive conduit sections 18 and 20 and facilitate assembly of assembly 10. A pair of housings 66 and 68 (shown in phantom in FIG. 1 and 8) can be secured to channels 70, 72, 74 and 76 to provide a cover for central body 11.

Sensing assembly 10 is adapted to be installed in the supply line that carries the fluid whose mass flow rate is to be measured. The line is broken to form a fluid exit and fluid reentry for the line. Inlet 13 of sensing assembly 10 is placed in fluid communication with the line exit using flange 15, and outlet 17 is placed in fluid communication with the line reentry using flange 19. Accordingly, fluid flowing through the line will exit the line at the line exit to enter the sensing assembly at its inlet 13. After flowing through passage 61 of manifold 22 the fluid will be split into two streams of generally equal mass flow rates by casting 27. The two streams enter and flow through conduit sections 18 and 20. After the streams enter casting 53 and manifold 24, the two streams are united. The joined stream travels through passage 51 and leaves the sensing assembly at outlet 17 to reenter the line at the line reentry.

Sensor assembly 10 includes a conduit drive assembly 26 and a pair of velocity sensors 28 and 30. Position or acceleration sensors, or any other type of motion sensor, could be used in place of velocity sensors 28 and 30. Conduit drive assembly 26 exerts force against conduit sections 18 and 20 along axis Z-Z'. The direction in which assembly 26 exerts force against sections 18 and 20 periodically is reversed to cause sections 18 and 20 to vibrate. The direction in which assembly 26 exerts force on section 18 is always opposite to that in which assembly 26 exerts force on section 20.

Figure 18:
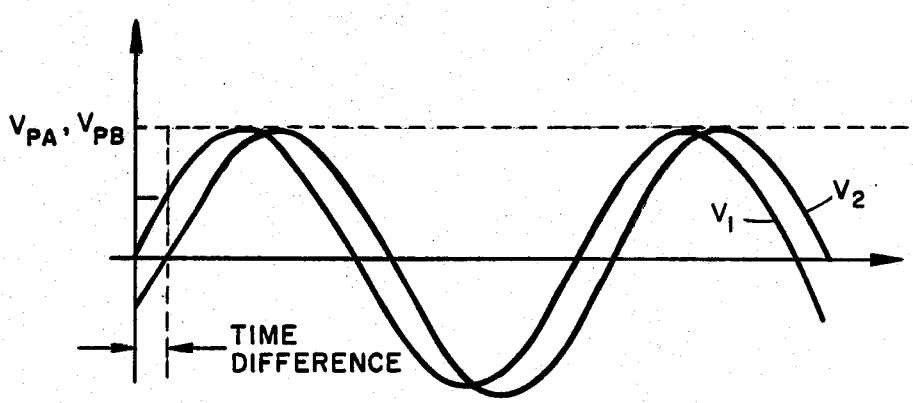
FIG. 18 is a graphic representation of the periodic electrical signals produced by the motion sensors of a vibratory mass flow meter.
Figure 19:
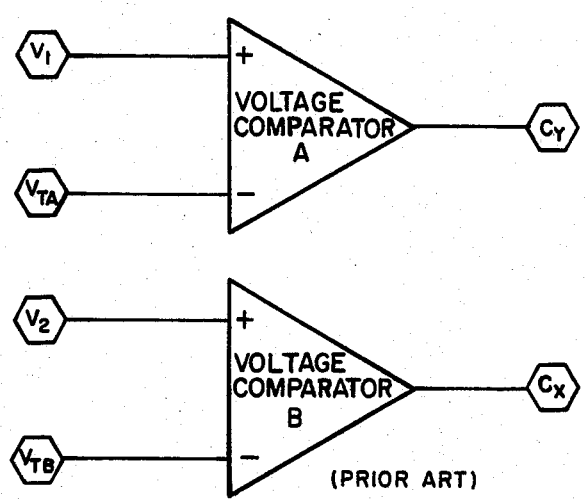
FIG. 19 is a diagrammatic representation of a pair of voltage comparators used with the time differencing technique of the prior art.
Figure 20:
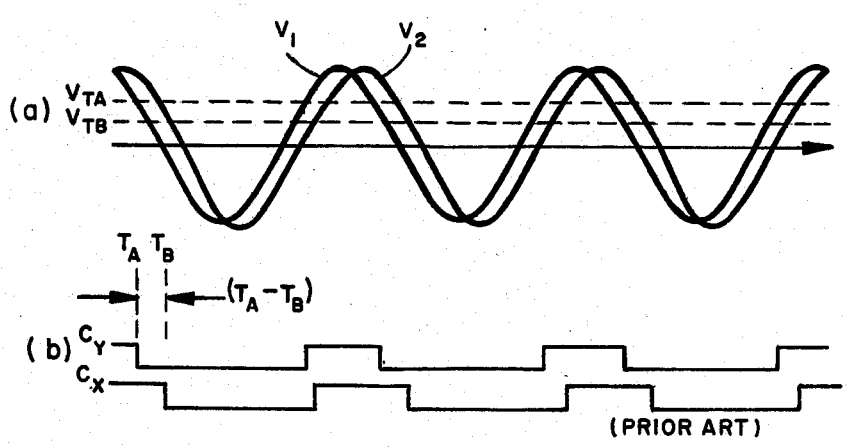
FIG. 20 shows the periodic electrical signals produced by the position sensors of and the threshold signals produced by known systems employing the time differencing technique and the signals produced by the voltage comparators shown in FIG. 19.

As can be seen in FIG. 7, each of sensors 28 and 30 and conduit drive assembly 26 includes a cylindrical permanent magnet 48 that is secured to a magnet holder 50. Permanent magnet 48 is adapted to be received by the passage 52 formed by cylindrical electrical coil 54. Magnet holder 50 is mounted to section 20 and coil 54 is secured to conduit section 18 in any suitable fashion. Accordingly, movement of conduit sections 18 and 20 relative to each other will cause movement of magnets 48 within passages 52 of sensors 28 and 30. Movement of magnet 48 within the coil 54 of a velocity sensor 28 or 30 generates a voltage (of the type shown in FIGS. 10 and 18) that is proportional to the velocity at which conduit sections 18 and 20 are moving relative to each other. Conduit drive assembly 26 also comprises a permanent magnet 48 that is secured to a magnet holder 50 and an electrical coil 54 that defines a passage 52. Magnet holder 50 of assembly 26 is secured to conduit section 20 and coil 54 is secured to conduit section 18. A sinusoidal voltage is applied to coil 54 of assembly 26, which causes oscillatory movement of coil 54 and base 50 relative to each other to cause conduit sections 18 and 20 to vibrate. Accordingly, applying a sinusoidal voltage to coil 54 of conduit drive assembly 26 causes conduit sections 18 and 20 to vibrate and causes sensors 28 and 30 to produce sinusoidal voltage signals that are proportional to the velocity at which the sections of the conduit to which they are mounted are moving.

If the mass flow rate of fluid travelling through sections 18 and 20 is zero, the sinusoidal signals produced by velocity sensors 28 and 30, ideally, will be in phase with each other. However, fluid flowing through conduit sections 18 and 20 will coact with vibrating conduit sections 18 and 20 to produce Coriolis forces that are exerted on conduit sections 18 and 20. Detailed discussions of the generation of Coriolis forces in a vibrating conduit and the effect of those forces on the motion of the conduit can be found in the art identified in the section hereinabove entitled Description of the Prior Art. The generated Coriolis forces cause the oscillating sections of conduit sections 18 and 20 to be out of phase with each other. Therefore, when fluid is flowing through conduit 12 and conduit drive assembly 26 is vibrating conduit sections 18 and 20, velocity sensors 28 and 30 will produce signals, of the type shown in FIG. 18 and designated $V_1$ and $V_2$, that are shifted from each other. The magnitude of the phase shift is related to the magnitude of the Coriolis forces generated by the vibrating conduit and, hence, to the magnitude of the rate of mass flow through conduit 12.

Figure 9:
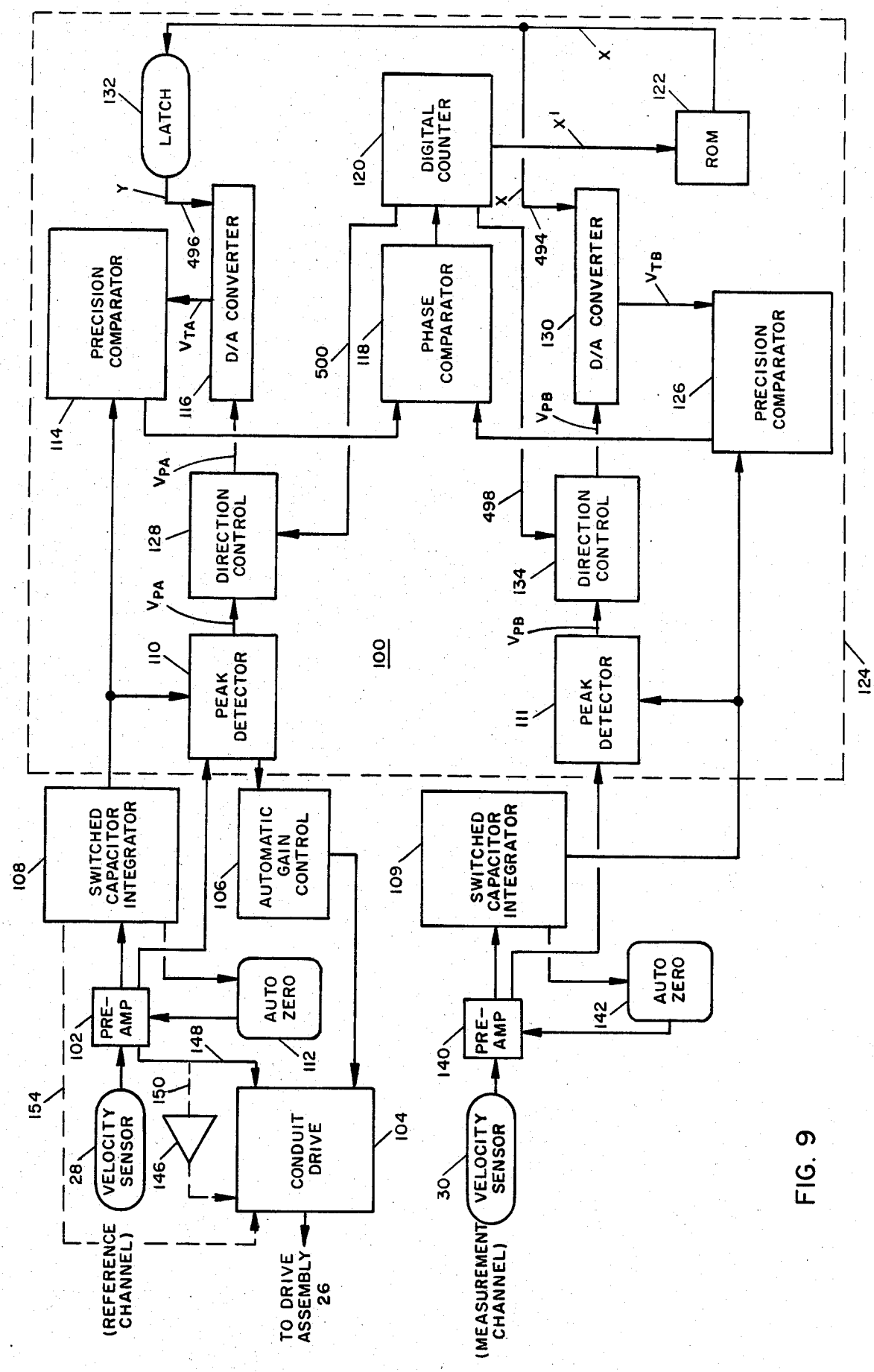
FIG. 9 is a block diagram representation of the preferred signal processing system provided by the present invention.

The preferred signal processing system 100 provided by the present invention is shown in FIG. 9. System 100 receives the sinusoidal signals produced by velocity sensors 28 and 30. System 100 provides a direct indication of the magnitude of the phase shift existing between the two signals. Once the magnitude of the phase shift is known, the relationship between the phase shift and the mass flow rate, which depends on the characteristics of the sensor assembly employed and the fluid whose mass flow rate is to be measured, can be used to determine the mass flow rate. The technique employed by signal processing system 100 yields a determination of phase shift that, essentially, does not depend on the angular frequency or peak amplitude of the sinusoidal force applied to conduit sections 18 and 20 by conduit drive assembly 26. Therefore, the many factors that can affect the frequency and amplitude of conduit vibration will not have any significant effect on the phase shift measurement made by system 100.

Rather than taking the difference between equations (15) and (16), which must be accomplished to employ the time differencing technique, system 100 effectively equates equation (15) to equation (16). The equation is accomplished by generating comparison signals corresponding to the electrical signals produced by sensors 28 and 30, shifting one of the comparison signals toward the remaining signal until there is, essentially, no phase difference existing between the two comparison signals, and recording the extent of the shift necessary to eliminate the phase difference. Equating equations (15) and (16) yields the following:

$$[\arcsin (V_{TB}/V_{PB}) + f(M)]/w = [\arcsin (V_{TA}/V_{PA}) - f(M)]/w \quad (18)$$

Solving for $2f(M)$ yields:

$$2f(M) = \arcsin (V_{TA}/V_{PA}) - \arcsin(V_{TB}/V_{PB}) \quad (19)$$

System 100 employs $V_{TA}$ as a constant that is determined at the condition of zero fluid flow through conduit 12. Solving for $V_{TB}$ yields:

$$V_{TB} = V_{PB} \sin [\arcsin (V_{TA}/V_{PA}) - 2f(M)] \quad (20)$$

Therefore, the DC voltage $V_{TB}$ is proportional to the phase shift, sin $2f(M)$, caused by the Coriolis forces generated by fluid flow through the conduit 12 coacting with the vibration of conduit 12. The technique used by system 100 provides highly accurate results if the following condition is maintained:

$$-90° < [\arcsin (V_{TA}/V_{PA}) - 2f(M)] < +90° \quad (21)$$

An alternative approach would involve generating only one comparison signal from one of the signals produced by a sensor 28 or 30 and shifting the comparison signal toward the signal produced by the remaining sensor 28 or 30 until the phase difference is zero. The magnitude of the phase shift would be indicative of the phase difference.

The manner in which equation (20) is used by system 100 to provide a measurement of mass flow rate that, essentially, does not depend on the amplitude or frequency of vibration of conduit 12 is best described while describing the details of system 100 shown in FIG. 9. As can be determined from FIG. 9, system 100 employs two channels, referred to as the measurement channel, which is fed by velocity sensor 30, and the reference channel, which is fed by velocity sensor 28. The reference channel includes a preamplifier 102 that boosts to a suitable level the velocity signal it receives from velocity sensor 28. Preamplifier 140 operates in the same manner as preamplifier 102. Conduit drive 104 receives the amplified velocity signal from preamplifier 102 along line 148, suitably amplifies the amplified velocity signal to produce a drive signal and applies the drive signal to coil 54 of conduit drive assembly 26 to vibrate conduit sections 18 and 20. The gain of conduit drive 104 is controlled by automatic gain control 106 to ensure that the drive signal applied to conduit drive assembly 26 produces a desired amplitude of vibration of conduit section 18.

Switched capacitor integrator 108 receives the amplified velocity signal from preamplifier 102. Switched capacitor integrator 108 integrates the amplified velocity signal to produce an integrated velocity signal, or quadrature signal, that is used by peak detector 110 to determine the peak amplitude of the amplified velocity signal produced by preamplifier 102. In addition to providing a quadrature signal, switched capacitor integrator 108 improves the performance of system 100 by providing noise rejection. However, the inclusion of switched capacitor integrator 108 adds appreciably to the cost of producing system 100. Since the improved performance provided by switched capacitor integrator 108 is not necessary to proper functioning of system 100, it may be replaced in system 100 by a conventional integrator. If switched capacitor integrator 108 is eliminated, any known circuits that can produce a quadrature signal for peak detection purposes can be provided.

The signal produced by switched capacitor integrator 108 is also provided to auto zero 112. Auto zero 112 integrates the D.C. component of the signal produced by preamplifier 102 and switched capacitor integrator 108 and feeds the integrated signal back to the terminal of preamplifier 102 that would normally be connected to ground. Accordingly, any accumulated DC offset produced or received by preamplifier 102 will be eliminated, and the signal produced by preamplifier 102 will be an AC signal with virtually no DC component. Switched capacitor integrator 109 and auto zero 142 operate in the same manner as switched capacitor integrator 108 and auto zero 112, respectively.

Peak detector 110 receives the amplified velocity signal produced by preamplifier 102 and the integrated velocity signal, or quadrature signal, produced by switched capacitor integrator 108. Peak detector 110 produces positive and negative peak signals $V_{PA}$ representative of the peak amplitude of the integrated velocity signal produced by preamplifier 102 and switched capacitor integrator 108.

Peak detector 111 receives the amplified velocity signal produced by preamplifier 140 and switched capacitor integrator 109 and produces positive and negative peak signals, $V_{PB}$, that represent the peak amplitude of the integrated velocity signal produced by switched capacitor integrator 109.

Automatic gain control 106 receives the peak signal produced by peak detector 110 and compares the peak signal to a reference level that represents the desired amplitude of vibration of conduit 12. Automatic gain control 106 produces a command signal representative of the difference between the peak signal and the reference signal and applies the command signal to conduit drive 104. The command signal causes the gain of conduit drive 104 to be so adjusted that the drive signal applied to conduit drive assembly 26 by conduit drive 104 causes conduit section 18 to vibrate at the desired amplitude.

Peak detectors 110 and 111, precision comparators 114 and 26, D/A converters 116 and 130, direction controls 128 and 134, phase comparator 118, digital counter 120, read-only memory ("ROM") 122 and latch 132 form a closed loop feedback control system 124. Control system 124 receives the integrated velocity signal from switched capacitor integrators 108 and 109 and produces a periodic comparison signal corresponding to each integrated velocity signal. Control system 124 shifts one of the comparison signals, the measurement signal, toward the remaining comparison signal, the reference signal, and records the magnitude of the shift necessary to eliminate the phase difference between the two signals. The recorded signal is, therefore, related to the phase difference existing between the two velocity signals produced by velocity sensors 28 and 30. The recorded signal is stored in digital counter 120 of control system 124. Changes in the phase difference between the two velocity signals, which occur when the mass flow rate of the fluid changes, are reflected by the occurrence of a corresponding phase shift between the comparison signals. System 124 alters the count stored in counter 120 to reflect the new phase shift existing between the comparison signals as a comparison signal is shifted to reduce the phase shift to, essentially, zero. Thus, the count stored by counter 120 at a steady state, or null, condition, reflects the total phase shift existing between the velocity signals and, thus, the current mass flow rate.

Generally, system 124 shifts the measurement comparison signal toward the reference comparison signal until the comparison signals are substantially in phase with each other. The measurement comparison signal is shifted by adjusting the value of $V_{TB}$. As can be seen from FIG. 10, increasing the value of $V_{TB}$ causes the measurement comparison signal to shift toward the right and decreasing the value of $V_{TB}$ causes the measurement comparison signal to shift toward the left. As the count contained in counter 120 is incremented or decremented, the value of $V_{TB}$ is increased or decreased, respectively, by D/A converter 130. When a change in the mass flow rate occurs, there is a corresponding change in the phase difference existing between the velocity signals produced by velocity sensors 28 and 30. Precision comparators 114 and 126 create comparison signals having a corresponding phase difference existing between them. During each cycle, the count in counter 120 is incremented or decremented and the level of $V_{TB}$ is correspondingly increased or decreased, respectively. The increase or decrease in the level of $V_{TB}$ causes the measurement comparison signal to shift toward the left or the right, but always in a direction to decrease the phase difference between the comparison signals. The process is continued until the null condition is reached, in which condition the comparison signals are substantially in phase and successive cycles of the measurement comparison signal cause the measurement signal to shift to the right and the left to cause the measurement signal to oscillate about the point at which the measurement comparison signal is in phase with the reference comparison signal. Stated differently, in the null condition system 124 alternately increments and decrements counter 120 by one count, and causes the measurement comparison signal to alternately lead and lag the reference comparison signal by a very small angle. Counter 120 contains the measurement count signal which, when system 124 is in the null condition, is proportional to the mass flow rate of the fluid flowing through conduit 12. A subsequent change in the mass flow rate once again causes the comparison signals to be out of phase with each other until system 124 shifts the measurement comparison signal toward the reference comparison signal until the two comparison signals are essentially in phase with each other.

In particular, direction control 134 receives direction signals from counter 120 along line group 498 that correspond to the direction of fluid flow through conduit 12. If the direction of flow is positive, that is, in the direction indicated by the arrow in FIG. 1, direction control 134 transmits to D/A converter 30 positive peak signals from peak detector 111. If the direction of fluid flow through conduit 12 is negative, that is, in a direction opposite to that shown by the arrow in FIG. 1, direction control 134 transmits negative peak signals to D/A converter 130 from peak detector 111. Direction control 128 receives latched direction signals from counter 120 along line group 500. As is described in more detail below, the latched direction signals maintain their values throughout the operation of the meter and indicate whether the velocity signal produced by sensor 28 leads or lags the velocity signal produced by sensor 30 under no flow condition. Although the velocity signals should be in phase with each other under a no flow condition, misalignment problems may cause a phase difference.

D/A converter 116 receives a peak signal ($V_{PA}$) from direction control 128 and a twelve bit latched count signal (Y) from latch 132 along line group 496. The latched count signal Y represents the extent of misalignment of the meter at the no flow condition. The value of the latched count signal remains fixed during operation of the meter and is used to offset the effects of meter misalignment. D/A converter 116 produces an analog threshold signal, designated $V_{TA}$, which can be expressed as:

$$V_{TA} = K\ (Y/4096)\ V_{PA} \quad (22)$$

where K is a constant having a value between 0 and 1 that is used for scaling purposes, Y is the latched count signal produced by counter 120 and ROM 122, the constant 4096 is the number of values (zero to 4095) that the term Y can assume, and $V_{PA}$ is the peak signal produced by peak detector 110. Similarly, D/A converter 130 receives a peak signal ($V_{PB}$) from peak detector 111 and a twelve bit measurement count signal (X') from counter 120 along line group 494. The measurement count signal, at steady state, represents the mass flow rate of the fluid flowing through conduit 12. D/A converter 130 produces a signal, designated $V_{TB}$, that is represented by the following expression:

$$V_{TB} = K\ (X/4096)\ V_{PB} \quad (23)$$

where $V_{TB}$ is the signal produced by D/A converter 130, X is the value of the measurement count signal produced by counter 120 and ROM 122, and $V_{PB}$ is the signal produced by peak detector 111. Substituting the expressions for $V_{TA}$ and $V_{TB}$ into equation (20) yields:

$$KX/4096 = \sin\ [\arcsin\ (KY/4096) - 2f(M)] \quad (24)$$

Solving for X yields:

$$X = [4096/K]\ \sin\ [\arcsin\ (KY/4096) - 2f(M)] \quad (25)$$

where X is a twelve bit binary number whose magnitude is proportional to the forces generated by the flow of fluid through conduit 12 and the vibration of conduit 12. The value of X is, essentially, independent of the amplitude of the velocity signals produced by velocity sensors 28 and 30 and, thus, is independent of the amplitude of vibration of conduit 12. Further, the value of X is independent of the frequency, w, of vibration of conduit 12, and, thus, the frequency of the sinusoidal signals produced by velocity sensors 28 and 30.

Figure 10:
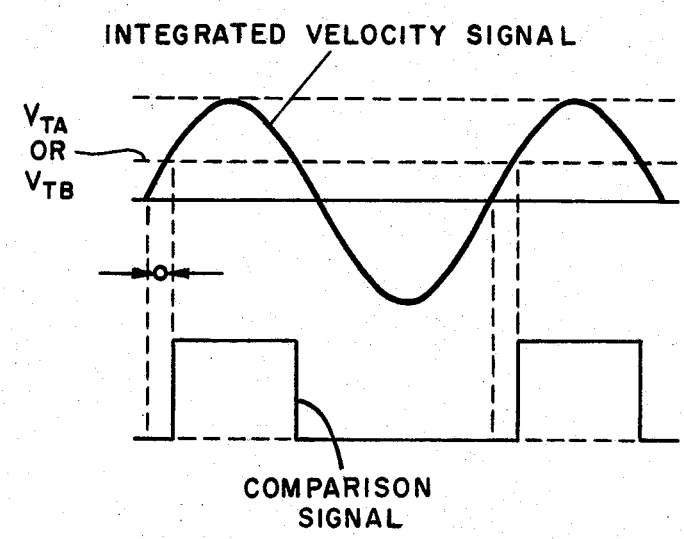
FIG. 10 shows in graphic form the periodic and threshold signals received by and the comparison signal produced by the precision comparator.

Precision comparators 114 and 126 and phase comparator 118 operate to record the measurement count signal, X, in counter 120. Precision comparator 114 receives the integrated velocity signal from switched capacitor integrator 108 and $V_{TA}$ from D/A converter 116. Precision comparator 114 compares the integrated velocity signal to $V_{TA}$. FIG. 10 illustrates the operation of each precision comparator 114 and 126. Comparator 114 produces a low signal when the value of the integrated velocity signal is less than $V_{TA}$ and produces a high signal at the time when the integrated velocity signal rises above $V_{TA}$. Therefore, the reference comparison signal produced by precision comparator 114 is shifted from the integrated velocity signal to an extent dictated by $V_{TA}$. Precision comparator 126 receives the integrated velocity signal produced by switched capacitor integrator 109 and $V_{TB}$ that is generated by D/A converter 130. Precision comparator 126 operates in the same manner as that in which precision comparator 114 operates to produce the measurement comparison signal. Generally, the output of D/A converter 116, $V_{TA}$, is held constant to provide a reference comparison signal that does not shift with respect to its corresponding velocity signal and toward which the measurement comparison signal can be shifted. The measurement comparison signal produced by comparator 126 is shifted toward the reference comparison signal by altering the value of $V_{TB}$.

As the measurement comparison signal is shifted toward the reference comparison signal, counter 120 records the extent of the shift. Counter 120 is either incremented or decremented once during each cycle of the measurement comparison signal. Phase comparator 118 receives the comparison signals and determines whether counter 120 should be incremented or decremented during each cycle of the measurement comparison signal. Phase comparator 118 causes counter 120 to be incremented if the measurement comparison signal lags the reference comparison signal and causes counter 120 to be decremented if the measurement comparison signal leads the reference comparison signal. Therefore, when system 124 is in the null condition, the value of X contained in counter 120 is proportional to the forces produced by the flow of fluid through conduit 12 and the determination of the magnitude of the mass flow rate can be made.

Equation (25) indicates that the measurement count signal, X, is nonlinear. If desired, ROM 122 can be provided to make the count signal linear. ROM 122 is so mapped that:

$$X = 4096/K \sin (KX'/4096) \quad (26)$$

Solving for X' yields:

$$X' = (4096/K) \arcsin (KX/4096) \quad (27)$$

Substituting into equation (27) the expression for X found in equation (25) yields:

$$X' = (4096/K) [\arcsin (KY/4096) - 2f(M)] \quad (28)$$

which is a linear expression for the count contained in counter 120. At the no-flow condition, equation (28) becomes:

$$2f(0) = \arcsin (KY/4096) \quad (29)$$

where $f(0)$ is $f(M)$ at the no-flow condition. Accordingly:

$$Y = (4096/K) \sin [2f(0)] \quad (30)$$

At the no-flow condition, the value of X' in equation (28) is zero as long as the value of Y in equation (28) satisfies equation (30). Therefore, X' can be expressed as follows:

$$X' = 4096/K [2f(0) - 2f(M)] \quad (31)$$

The value of K can be determined by substituting into equation (31) the value of X' for a full scale phase shift and solving for K, noting that a conversion from degrees to radians is required, and that $2\pi$ radians equals 360°:

$$X'(4095) = 4095 = [4096/K] [F(3.14159)/360] \quad (32)$$

Where F is the full scale phase shift in degrees and 4095 is the value of X' when the full scale phase shift is realized. Solving for K yields:

$$K = 0.017453292F \quad (33)$$

The term arcsin (KY/4096) exists due to the mismatch or misalignment existing among conduit sections 18 and 20, sensors 28 and 30 and system 100. Due to those factors, there will exist a count in counter 120 under a no-flow condition. Permitting the no-flow count to remain in counter 120 would cause an inaccurate result to be produced under flow conditions. Latch 132 is provided to eliminate the no flow count from counter 120. Latch 132 receives the measurement count signal, X, from ROM 122. Strobing latch 132 causes the signal appearing at its input to be transferred to its output. To eliminate the no-flow count, oscillation of conduit 12 at no flow is commenced and any mismatch that occurs among the components of sensing assembly 10 and signal processing system 100 will cause velocity sensors 28 and 30 to generate sinusoidal signals that are not in phase with each other. Zero switch 136 (FIG. 15) is depressed to reset counter 120 and cause a zero output to be latched into latch 132. After a delay, control system 124 reaches the null condition and causes a count to be accumulated in counter 120 that reflects the phase difference between the two velocity signals produced by velocity sensors 28 and 30. ROM 122 applies the signal X to the input of latch 132 and latch 132 is strobed to transfer and maintain the value of X on its output as signal Y. The application of Y to D/A converter 116 by latch 132 causes a change in the value of $V_{TA}$ that is applied to precision comparator 114. Precision comparator 114 produces a reference comparison signal that is shifted from the integrated velocity signal it receives from switched capacitor integrator 108 by an amount that corresponds to the phase shift existing between the velocity signals produced by velocity sensors 28 and 30. The shift in the reference signal causes a difference in the phases of the inputs to phase comparator 118 and phase comparator 118 causes counter 120 to begin to count toward zero. When counter 120 reaches zero, system 100 is in the null condition. The value of Y that is latched into the output of latch 132 ensures that the count, X', produced by counter 120 will accurately reflect the mass flow rate.

FIGS. 11 through 15 are schematic representations of circuits that are particularly useful for implementing corresponding blocks of the diagram shown in FIG. 9. Preamplifier 102 (FIG. 11) includes an amplifier 200 and a resistor 202. The velocity signal produced by amplifier 200 on line 204 is the amplified difference between the signals appearing on lines 206 and 208, which constitute the velocity signal produced by velocity sensor 28. Resistor 202 determines the gain of amplifier 200 according to the following expression:

$$1 + \frac{40,000}{R_G} \quad (34)$$

Where $R_G$ is the resistance of resistor 202.

Switched capacitor integrator 108 (FIG. 11) receives the amplified velocity signal from preamplifier 102 along line 204. Resistor 210, capacitor 212 and operational amplifier 214 form an inverting integrator 216. Without further compensation, the DC offset contained in the amplified velocity signal received by switched capacitor integrator 108 along line 200 could cause the integrated velocity signal produced by amplifier 200 to increase or decrease to such an extent that amplifier 214 produces a DC signal equal to the level of the control voltage supplied to amplifier 214. Accordingly, switched capacitor inverter 230 samples the output of amplifier 214 produced on line 218 and feeds back to amplifier 214 along line 220 the DC component of the output of amplifier 214. Amplifier 214 subtracts from the amplified velocity signal any accumulated DC signal appearing on line 220 to remove any significant DC components from the integrated velocity signal. The output of amplifier 214 is sampled at a frequency of about 1 kHz to 5 kHz. Switch 222 and capacitors 224, 226 and 228 form a switched capacitor inverter 230 which has an AC gain of approximately 0.001:1. A suitable clock signal, which establishes the sampling frequency, is provided to clock switch inputs 232 and 234 along lines 236 and 238, and causes switch 222 to switch at the frequency of the clock signal. Alternately, the internal clock of switched capacitor inverter 230 can be used as the switching signal, in which case the value of capacitor 228 determines the sampling frequency. With switch 222 assuming the state shown in FIG. 11, the DC component of the integrated velocity signal charges capacitor 226. Upon receipt of the next clock pulse, the state of switch 222 switches and the charge on capacitor 226 is transferred to capacitor 224. Due to the difference in capacitance between capacitors 224 and 226, the voltage on capacitor 224 after the charge on capacitor 226 is transferred to it will be approximately 1/1000 of the voltage on capacitor 226. Due to the arrangement of the ground connections in switched capacitor inverter 230, the voltage on capacitor 224 will always be opposite to that on capacitor 226. Accordingly, the voltage applied to amplifier 214 along line 220 will operate to reduce the DC offset inherent in the signal on line 218. Therefore, integrator 216 has a DC gain of approximately one and an AC gain that is substantially determined by the combination of resistor 210 and capacitor 212.

Auto zero 112 (FIG. 11) receives the integrated velocity signal from switched capacitor integrator 108 and applies to preamplifier 102 a signal that operates to remove from the integrated velocity signal any DC component produced by amplifier 200. Amplifier 244, resistor 246, and capacitor 248 form an integrator that has a long time constant (on the order of several seconds). Resistors 250 and 252 divide the output of amplifier 244 and operate to multiply the time constant achieved by capacitor 248 and resistor 246. The output of amplifier 244 is fed to the terminal of amplifier 200 that would normally be connected to ground along line 256.

Peak detector 110 (FIG. 12) receives the amplified velocity signal from preamplifier 102 along line 258 and the integrated velocity, or quadrature, signal produced by amplifier 214 along lines 218, 260 and 262. Peak detector 110 employs the amplified velocity signal as the timing signal to indicate the time at which peak amplitudes of the integrated velocity signal occur and to produce the amplitude of the integrated velocity signal at those times. Resistors 264 and 266 and capacitor 268 provide AC and DC hysteresis to enable amplifier 270 to produce a signal having a single edge that occurs at about the same time as the occurrence of the zero crossing of the amplified velocity signal produced by preamplifier 102. The signal produced by amplifier 270 on line 272 is high when the amplified velocity signal is less than zero and is low when the amplified velocity signal is greater than zero. The output of amplifier 270 is supplied to the inverting input of one shot multivibrator 278 along lines 272 and 274 and to the noninverting input of one shot multivibrator 280 along lines 272 and 276. One shot 278 produces a negative pulse, or negative strobe, at every occurrence of a trailing edge of a signal produced by amplifier 270, and one shot 280 produces a negative pulse, or positive strobe, at every occurrence of a rising edge produced by amplifier 270. Integrated FET switch 282 is illustrated diagrammatically in FIG. 12. Switches 284, 286, 288 and 290 close upon receipt of a low signal at their inputs. Switch 284 of integrated switch 282 receives the negative strobe along line 292 and the integrated velocity signal along lines 262 and 296. Switch 286 of integrated switch 282 receives the positive strobe along line 294 and the integrated velocity signal along line 262. Each time switch input 298 of switch 284 receives a negative pulse, switch 284 closes for the duration of the pulse. Capacitor 302 charges to the level of the integrated velocity signal occurring during the time of occurrence of the negative strobe. Since each negative strobe occurs during the negative peak of the integrated velocity signal, capacitor 302 will always be charged to a voltage level equal to the then occurring negative peak value of the integrated velocity signal. Similarly, switch 286 is closed during the occurrence of each positive strobe received by switch 286 at its input 300. Since each positive strobe occurs at the occurrence of the positive peak amplitude of the integrated velocity signal, capacitor 304 will always be charged to a voltage level equal to the positive peak value of the integrated velocity signal. Switches 288 and 290 of integrated switch 282 receive at their inputs 306 and 308 from counter 120 along line group 500 latched direction signals that indicate whether the velocity signal produced by sensor 28 leads or lags the velocity signal produced by velocity sensor 30 in the no-flow condition. Line 310 assumes a low value when the signal produced by sensor 30 lags the signal produced by sensor 28 and is otherwise high. The signal on line 312 is low when the signal produced by sensor 30 leads the signal produced by sensor 28 and is otherwise high. The direction signals are never both high or low at the same time. When the direction signal on line 310 is low, the direction signal on line 312 is high, and only switch 288 is closed. The voltage across capacitor 302 is transferred to the input of buffer amplifier 314 and represents the negative peak amplitude of the integrated velocity signal. When the direction signal on line 312 is low, the direction signal on line 310 is high, and only switch 290 is closed. The positive voltage impressed across capacitor 304 is transferred to the noninverting input of amplifier 314, and represents the positive peak amplitude of the integrated velocity signal. Accordingly, if the direction signal on line 310 is low, amplifier 314 transmits a negative signal to D/A converter 116 along line 316. If the direction signal on line 312 is low, amplifier 314 transmits to D/A converter 116 a positive signal along line 316 which represents the positive peak amplitude of the integrated velocity signal.

Figure 12:
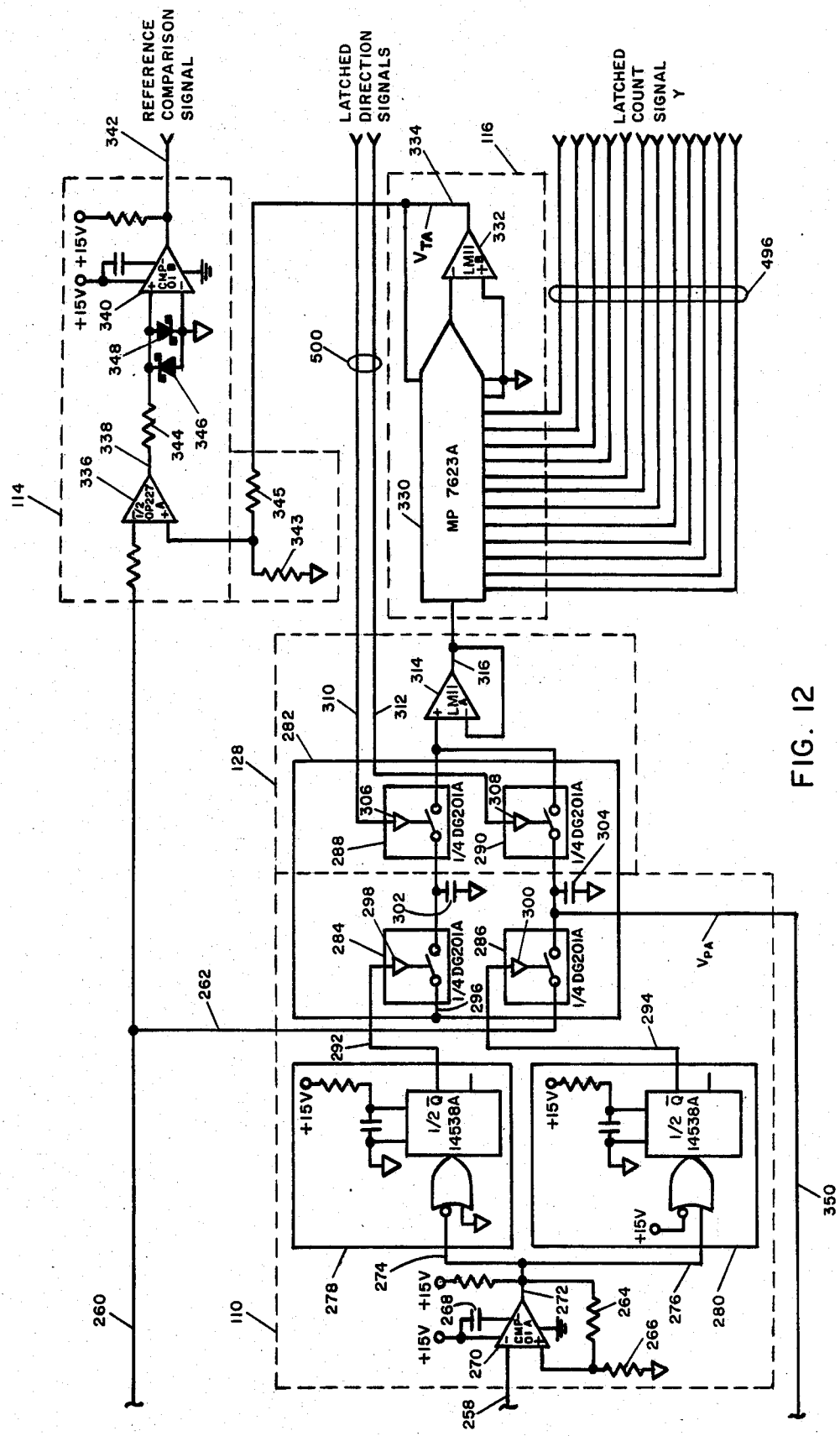

D/A converter 116 receives the appropriate peak amplitude signal from direction control 128 along line 316 and the latched count signal, Y, generated by latch 132 along line group 496. FIG. 12 shows the conventional configuration for D/A converter 116. D/A converter 330 is a commercially available D/A converter. D/A converter 116 produces $V_{TA}$ along line 334 in the form expressed by equation (22).

Precision comparator 114 receives $V_{TA}$ along line 334 and the integrated velocity signal along line 260, and produces the. reference comparison signal, which is of the type shown in FIG. 10. Comparator 336 receives both signals and produces on line 338 a signal that is low when the level of the integrated velocity signal is greater than the level of $V_{TA}$, and that is high at other times. Amplifier 340 produces the reference comparison signal on line 342. Resistor 344 is provided for current limiting and Schottky diodes 346 and 348 limit the excursions of the input signals to amplifier 340 to enhance the speed of comparator 114. The sizes of resistors 343 and 345 determine the full scale phase shift provided by phase comparator 114 and, thus, determine the value of F in equation (33), which establishes the value of K.

Automatic gain control 106 receives the positive peak signal, $V_{PA}$, from peak detector 110 along line 350.

Amplifier 352 produces on line 354 a command signal representing the integrated difference between the positive peak signal and the approximately ten volt reference supplied to amplifier 352 by the voltage divider formed by resistors 351 and 353. Conduit drive 104 receives the command signal produced by automatic gain control 106 along line 356. The command signal on line 356 is received by optical isolator 358. The amount of current flowing through LED 360 determines the conductivity of FET 362. The conductivity of FET 362 is proportional to the amount of current flowing through LED 360. Since the gain of amplifier 364 varies proportionally with the conductivity of FET 362, the gain of amplifier 364 varies proportionally with the level of the current flowing through diode 360. Typically, an output of approximately zero volts is produced by amplifier 352 along line 354, which indicates that the desired level of vibration of conduit 18 is being achieved, and that causes a predetermined level of current to flow through diode 360, thereby achieving a predetermined gain of amplifier 364. An increase in the level of vibration of conduit 12 causes a more positive output to be produced by automatic gain control 106, which reduces the current flow through diode 360 and reduces the gain of amplifier 364. A reduction in the level of vibration below that which is desired causes a more negative signal to be produced by automatic gain control 106, which increases the current flowing through diode 360 and increases the gain of amplifier 364. The output of amplifier 364 is provided to power driver 368 along line 366. Power driver 368 suitably amplifies the signal produced by amplifier 364 to produce a drive signal and applies the drive signal to coil 54 of conduit drive assembly 26 along line 370.

Preamplifier 140, auto zero 142, switched capacitor integrator 109, peak detector 111, direction control 134, precision comparator 126, and D/A converter 130 have the same configuration as their counterparts, which were described in detail above.

Figure 13:
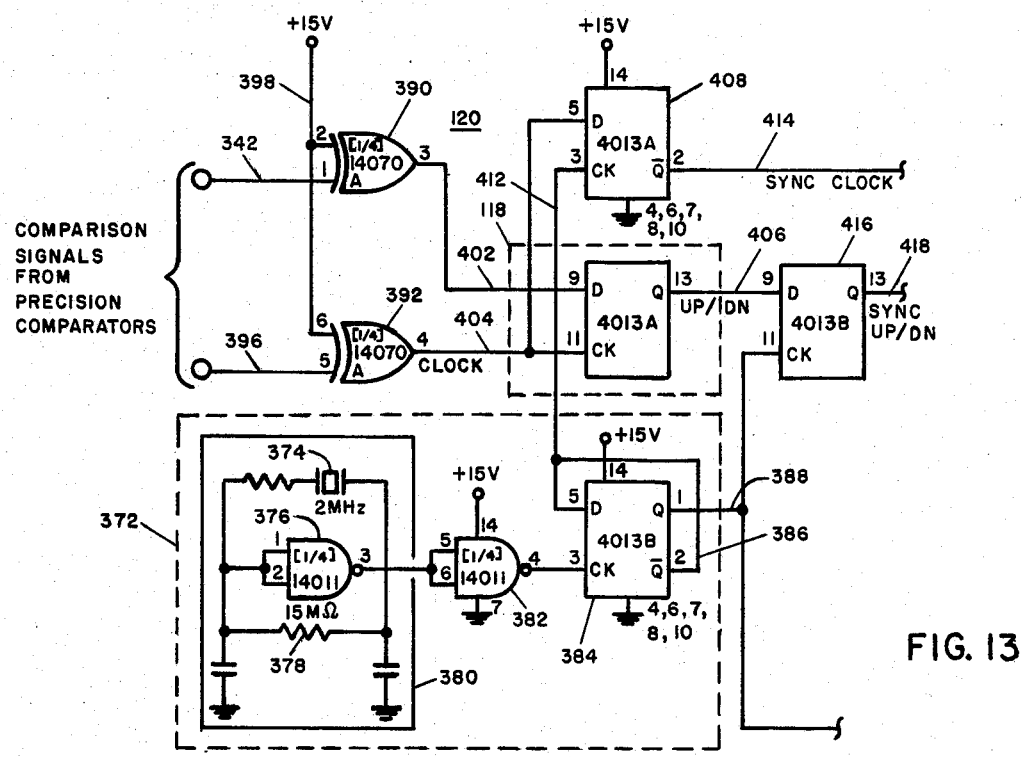
Figure 14:
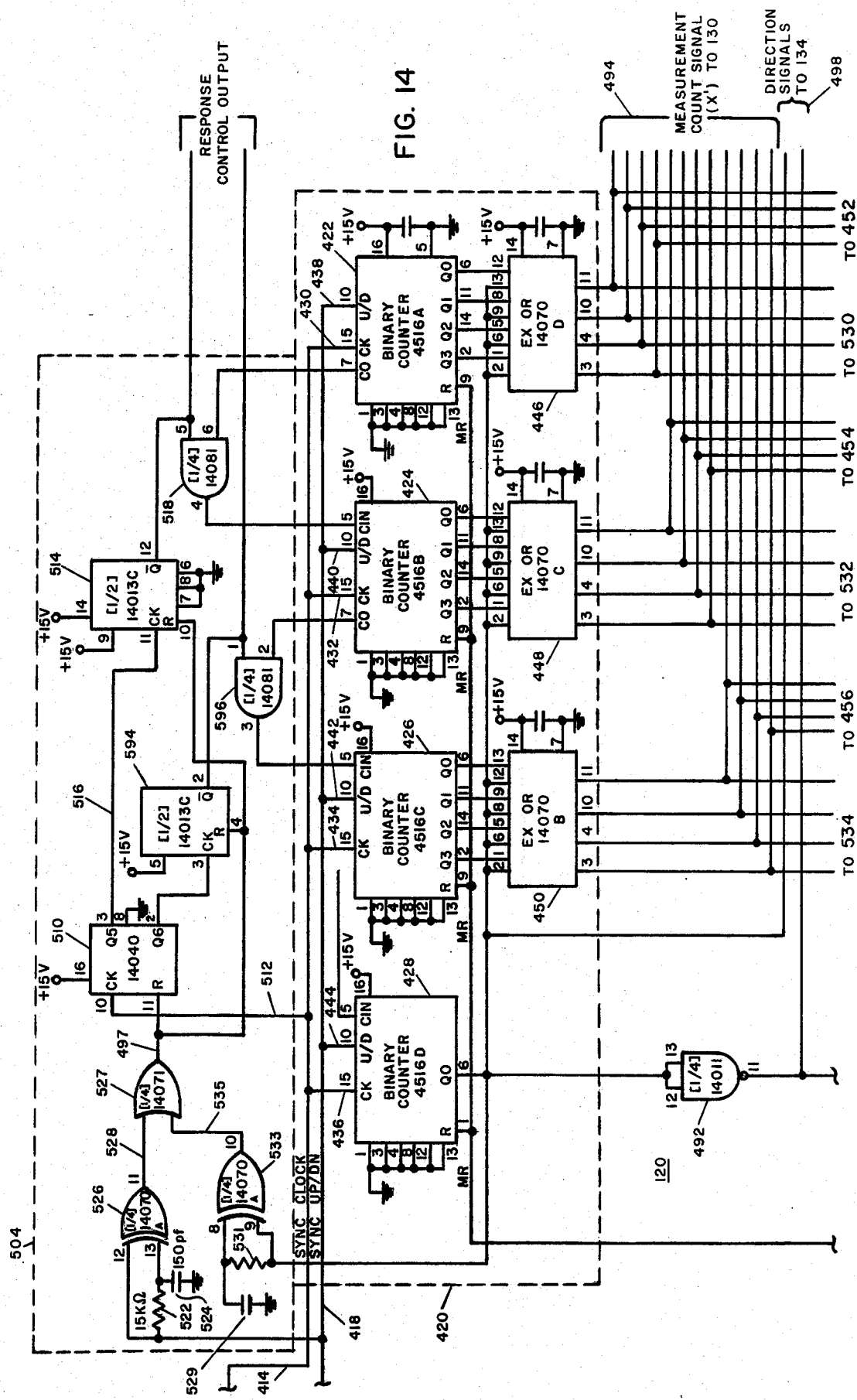
Figure 15:
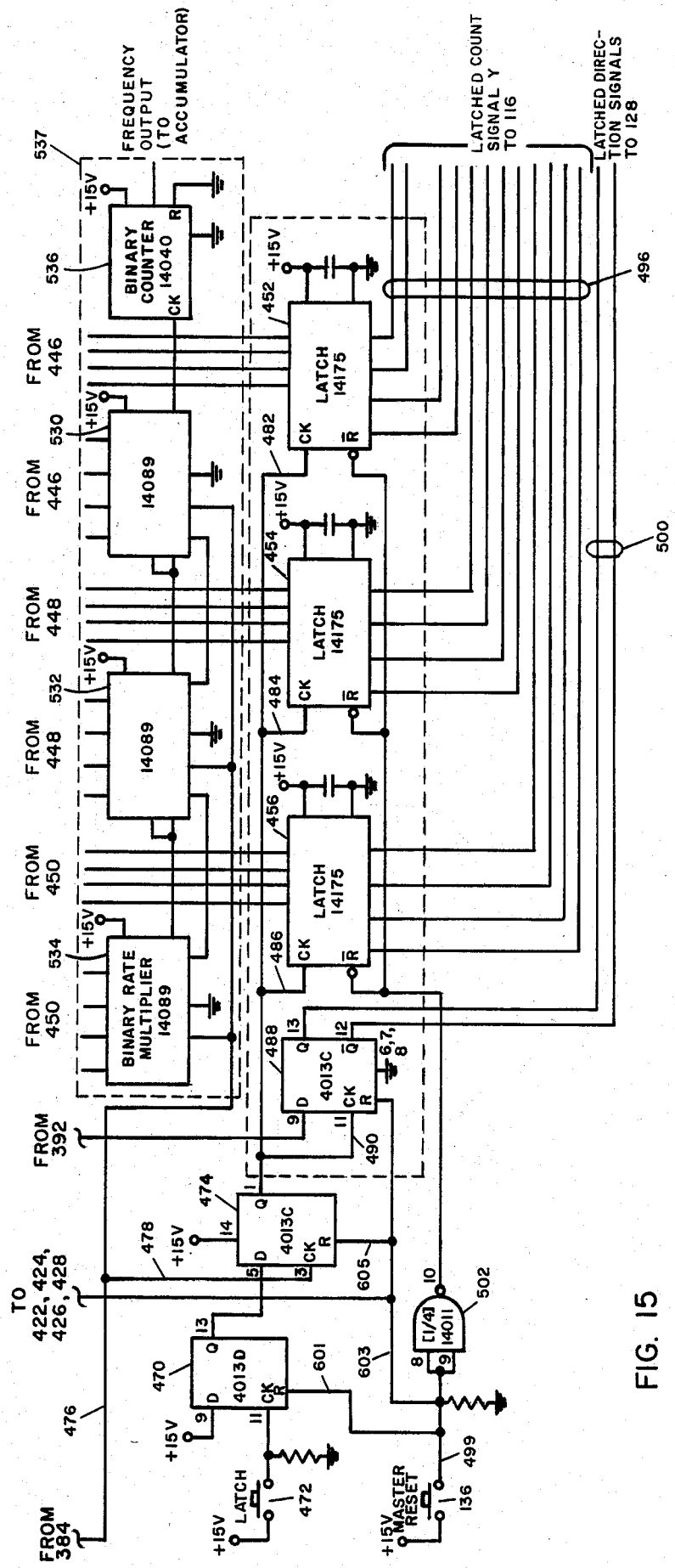

FIGS. 13, 14 and 15 show the details of the phase comparator 118, latch 132 and digital counter 120 shown in FIG. 9. Timing generator 372 produces timing signals that control the operation of counter 120. A two megahertz crystal 374, NAND gate 376, and resistor 378 form the nucleus of a conventional crystal oscillator 380. Inverter 382 inverts the signal produced by oscillator 380 and applies the inverted signal to the clock input of divider network 384. Divider 384 divides the two megahertz signal it receives from gate 382 and produces a one megahertz square wave on line 386 and line 388. The signals on lines 386 and 388 are 180° out of phase with each other and, thus, form the basis of two distinct timing phases.

EXCLUSIVE-OR gate 390 receives plus fifteen volt control voltage along lines 398 and 400 and the reference signal from precision comparator 114 along line 342. EXCLUSIVE-OR gate 392 receives plus fifteen volt control voltage along line 398 and the measurement comparison signal from precision comparator 126 along line 396. Each gate 390 and 392 produces a high signal when its input on line 342 or 396 falls to a low value. The outputs of gates 390 and 392 are transmitted to phase comparator 118 along lines 402 and 404. The signal on line 404, the CLOCK signal, is used by counter 420 (FIG. 14) to signal the times at which the count signal maintained by counter 420 is changed, and is also used by phase comparator 118 to determine whether the measurement comparison signal leads or lags the reference comparison signal. The signal produced by phase comparator 118 on line 406, the UP/DN signal, is used to determine whether each change to the count should be made by incrementing or decrementing the count. If the signal on line 402 assumes a high value before the leading edge of the CLOCK signal on line 404 reaches phase comparator 118, the UP/DN signal goes high. If the leading edge of the CLOCK signal on line 404 reaches phase comparator 118 before the signal on line 402 assumes a high value, the UP/DN signal on line 406 remains low until the next cycle.

Flip-flop 408 receives the CLOCK signal produced by gate 392. Flip-flop 408 synchronizes the CLOCK signal with the one megahertz signal flip-flop 408 receives from flip-flop 384 along lines 386 and 412. Accordingly, flip-flop 408 produces a synchronized clock signal, or SYNC CLOCK signal, on line 414 that has a frequency equal to that of the signal produced by gate 392, that is 180° out of phase with the signal produced by gate 392, and that is synchronized to the one megahertz clock signal produced at the Q' terminal of flip-flop 384. The SYNC CLOCK signal is used to drive the binary counters of clock 120. Synchronizing the CLOCK signal with the signal produced by flip-flop 384 on line 386 ensures that rate multipliers 530, 532 and 534 will not be clocked while their inputs are changing. Flip-flop 416 receives the UP/DN signal produced by phase comparator 118 and produces on line 418 a signal, the SYNC UP/DN signal, by synchronizing the UP/DN signal with the one megahertz noninverted signal produced by flip-flop 384 at terminal Q. Accordingly, the measurement comparison signal is, essentially, synchronized to one phase of the one megahertz clock signal and the UP/DN signal produced by phase comparator 118 is synchronized to the remaining phase of the one megahertz clock signal. The SYNC UP/DN signal 418 determines whether the count produced by counter 420 should be incremented or decremented, and the SYNC CLOCK signal on line 414 controls the timing of the transfer of count data to the output of counter 420.

Each time phase comparator 118 is clocked, phase comparator 118 determines whether clock 120 should be incremented or decremented and sets the UP/DN signal on line 406 at the appropriate level, logical "1" or "0". On the leading edge of the SYNC CLOCK signal, twelve bit binary counter 420 is clocked to increment or decrement it in accordance with the SYNC UP/DN signal on line 418. Counter 420 includes four binary counters 422, 424, 426 and 428. Binary counters 422, 424, 426 and 428 receive the SYNC CLOCK signal from flip-flop 408 along lines 414 and 430, 432, 434 and 436, respectively, and the SYNC UP/DN signal along lines 418 and 438, 440, 442 and 444, respectively. Each time a counter 422, 424, 426 or 428 receives a clock pulse and is enabled by a logical "0" applied to its CIN input, it increments or decrements in accordance with the level of the SYNC UP/DN signal and transfers its count to its outputs Q0, Q1, Q2 and Q3. Thus, if the SYNC UP/DN signal presented to each counter 422, 424, 426 and 428 is high, the count stored by the counters will be incremented when the next leading edge of the SYNC CLOCK signal is received. If the SYNC UP/DN signal presented to counters 422, 424, 426 and 428 is low, the count stored by the counters will be decremented when the next leading edge of the SYNC CLOCK signal is received. The outputs of counters 422, 424 and 426 represent the twelve bit measurement count signal, X', produced by digital counter 420 (and, thus, counter 120). Terminal Q1 of counter 422 is the least significant bit and terminal Q3 of counter 426 is the most significant bit of the count signal. Output Q0 of counter 428 is the sign bit and represents the direction signal that indicates whether flow through the conduit 12 is in the positive or negative direction.

D/A converters 116 and 130 require positive binary inputs. EXCLUSIVE-OR gates 446, 448 and 450 ensure that the binary inputs to D/A converters 116 and 130 are always positive, that is, the outputs of gates 446, 448 and 450 always form a positive twelve bit binary number. Gates 446, 448 and 450 receive the outputs produced by binary counters 422, 424 and 426, respectively, and output $Q_0$ of counter 428, and produce at their outputs the measurement count signal, X'. Gates 446, 448 and 450 perform the exclusive-or function on (i) output Q0 of counter 428 and (ii) each of the outputs Q0 through Q3 of each of binary counters 422, 424 and 426. Therefore, when output Q0 of counter 428 is high, indicating that the outputs of counters 422, 424 and 426 form a negative twelve bit binary number, gates 446, 448 and 450 form at their outputs the negative of the twelve bit number formed by counters 422, 424 and 426. When the Q0 output of counter 428 is low, gates 446, 448 and 450 do not invert the twelve bit number formed by counters 422, 424 and 426.

Output Q0 of binary counter 428 also represents the direction signal that is supplied to direction control 134. Inverter 492 inverts output Q0 of counter 428 to form the complimentary direction signal. The direction and the complimentary direction signals are provided to direction control 134 along line group 498.

The outputs of EXCLUSIVE-OR gates 446, 448 and 450, which form X', are provided to latches 452, 454 and 456, respectively. Latches 452, 454 and 456 produce the latched count signal, Y, along line group 496. As is noted hereinabove, the inclusion of ROM 122, shown in FIG. 9, is optional. The system shown in FIGS. 11 through 15 does not include ROM 122 for linearizing the count signal, X. Accordingly, X' is equal to X. Any conventional ROM that is suitably programmed as outlined above can be used to linearize the measurement count signal.

A latch command is applied to the clock input of flip-flop 470 upon actuation of latch offset switch 472. The Q output of flip-flop 470 is applied to the data terminal of flip-flop 474. The 1 MHz Q output of flip-flop 384 is applied to flip-flop 474 along lines 476 and 478. Accordingly, the latch command is synchronized with the SYNC UP/DN signal. The latch command always occurs on an alternate clock phase from that on which operative changes in the SYNC CLOCK signals occur. The Q output of flip-flop 474 is applied to latches 452, 454 and 456 along lines 480 and lines 482, 484 and 486, respectively. Each of latches 452, 454 and 456 transfers the signal appearing on its input to its output upon receipt of the latch command at its clock input. The latch command produced by flip-flop 474 at its Q output is also transmitted to flip-flop 488 along lines 480 and 490. Flip-flop 488 receives the complimentary direction signal produced by inverter 492. Accordingly, flip-flop 488 produces at its Q and Q' outputs latched direction and complimentary direction signals, respectively, each time flip-flop 488 receives at its clock input a latch command from flip-flop 474. Due to the configuration of flip-flop 470, two successive latch commands cannot be generated unless a reset signal is supplied to terminal R of flip-flop 470 after the first latch command is produced and before flip-flop 470 is clocked to produce the second latch command.

The measurement count signal X' is transmitted to D/A converter 130 along line group 494 and the latched count signal, Y, is transferred to D/A converter 116 along line group 496. The latched direction output is provided to direction control 128 along line group 500 and the direction output is transmitted to direction control 134 along line group 498.

The output of latches 452, 454 and 456 can be reset to zero by actuation of reset switch 136, which produces a reset signal. Latches 452, 454 and 456 require application of an inverted reset pulse to reset their outputs to zero. Accordingly, the reset signal is inverted by inverter 502 to form the reset command before it is applied to latches 452, 454 and 456. The reset signal is also applied to flip-flops 470 and 474, along line 499 and line 601 and lines 499, 603 and 605, respectively, to enable production of a synchronized latch command by flip-flop 474. The reset signal is applied to input terminal R of each of counters 422, 424, 426 and 428 to reset the counters. Finally, the reset signal is applied to the R input of flip-flop 488 to permit alteration of the latched direction signals. Reset switch 136 must be actuated upon start-up of the meter to permit the proper value of Y and the latched direction signals to be established.

Response control 504 monitors the number of consecutive count commands in one direction that are submitted to counter 420. That is, response control 504 looks at the consecutive number of increments or decrements that counter 420 is commanded to make. If counter 420 is commanded to make at least sixteen consecutive increments or sixteen consecutive decrements, response control 504 causes counter 420 to make succeeding increments or decrements in groups of seventeen counts. If sixteen further groups of seventeen consecutive increments or decrements are commanded, response control 504 causes counter 420 to make succeeding increments or decrements in groups of 273 counts. Response control 504 continues to cause counter 420 to increment or decrement in groups of seventeen or 273 counts until the SYNC UP/DN signal commands counter 420 to stop incrementing and begin decrementing or to stop decrementing and begin incrementing, at which point response control 504 causes counter 420 to begin incrementing or decrementing by one count. Response control 504 also causes counter 420 to stop counting by seventeen or 273 counts when a reversal of the direction of fluid flow through conduit 12 occurs. Counter 510 is a binary counter that is driven by the SYNC CLOCK signal it receives along lines 414 and 512. Counter 510 is reset each time it receives a reset signal along line 497, which occurs whenever the SYNC UP/DN signal on line 418 changes state or when output Q0 of counter 428 changes state to indicate that the direction of fluid flow has reversed. While counter 510 is reset and until at least sixteen falling edges of the SYNC CLOCK signal are received by counter 510 before it receives a reset signal, outputs Q5 and Q6 of counter 510 are low. Output Q' of each of flip-flops 514 and 594 is high and, because the CO output of each binary counters 422 and 424 is high, the output of each of AND gates 518 and 596 is high, and the CIN input of each of binary counters 424 and 426 is high and those counters are disabled. Thus, binary counter 422 is the only binary counter that is enabled, unless a carry-over condition exists, and counter 420 increments or decrements by one count. When sixteen falling edges of the SYNC CLOCK signal, or clock pulses, are received by counter 510 before a reset appears on line 497, output Q5 of counter 510 goes high and clocks flip-flop 514 along line 516. Output Q' of flip-flop 514 goes low and the CIN input of counter 424 goes low to enable counter 424. Accordingly, both counters 422 and 424 are enabled, clock pulses occurring on line 418 will be registered by both counters 422 and 424, and the output of counter 420 will be incremented or decremented by seventeen, rather than by one. If counter 510 receives a further sixteen clock pulses before a reset signal appears on line 497, output Q6 of counter 510 goes low, flip-flop 594 is clocked and produces a low signal at its Q' output, and AND gate 596 produces a low signal at the CIN input of counter 426. Accordingly, counters 426, 424 and 422 are all enabled and counter 420 increments or decrements its output by 273 counts rather than by seventeen or one. When a change in the level of the SYNC UP/DN signal occurs, resistor 522, capacitor 524, and EXCLUSIVE-OR gate 526 produce a pulse on line 528 which causes a reset signal to be produced by OR gate 527 on line 497. Counter 510 and flip-flops 514 and 594 are reset, outputs Q' of flip-flops 514 and 594 go high, and AND gates 518 and 596 apply a high signal to the CIN inputs of binary counters 424 and 426 to disable those counters and cause counter 420 to once again begin counting by one count. The same reset signal occurs on line 497 when the Q0 output of counter 428 changes state. Capacitor 529, resistor 531 and EXCLUSIVE-OR gate 533 produce a pulse on line 535 which causes OR gate 527 to produce a reset signal on line 497. It should be noted that counter 510 accumulates trailing edges of the SYNC CLOCK signal. A decision to reset response control 504 that is based on the SYNC UP/DN signal also occurs on trailing edges of the SYNC CLOCK signal.

The outputs of EXCLUSIVE-OR gates 446, 448 and 450 are provided to the inputs of binary rate multipliers 530, 532 and 534, respectively. Binary rate multipliers 530, 532 and 534, along with binary counter 536 form an output interface 537. Output interface 537 produces an output from signal X' having a form that is particularly useful. In particular, interface 537 produces pulses at a low frequency that is proportional to the mass flow rate of the fluid flowing through conduit 12. Accordingly, any suitable technique can be used to accumulate the pulses produced by interface 537 to provide a determination of the mass of fluid that has flowed through conduit 12. Rate multipliers 530, 532 and 534 are connected in a standard cascade configuration. Rate multipliers 530, 532 and 534 receive the alternate phase of the 1 MHz clock signal produced by oscillator 372. Multiplier 530 produces pulses at a frequency, $f_o$, that is expressed as follows:

$$f_o = \frac{f_i(X)}{4096} \quad (35)$$

where $f_1$ is 1 MHz, the frequency of the clock signal received by interface 537. The output of multiplier 530, $f_o$, is too high to be useful. Accordingly, $f_o$ is divided by counter 536 by a factor of from $2^1$ to $2^{12}$.

If desired, position sensors, rather than velocity sensors, can be used to detect conduit motion. If position sensors are used, the mathematical derivation of the equations implemented by the present invention is identical to that presented above, with the exception that the term representing the frequency of vibration of conduit 12, w, does not appear as a multiplier in equation (18). A suitable position sensor is a linear variable displacement transducer ("LVDT"). An LVDT would be mounted at each location at which velocity sensors 28 and 30 are mounted. If displacement, rather than velocity, sensors are used to detect the movement of conduit 12, preamplifier 102 produces an amplified position signal that must be shifted by plus 90 degrees before it can be applied to drive assembly 26, to ensure that sustained oscillation is achieved. The driving force produced by assembly 26 is proportional to the drive current received by assembly 26 and, thus, lags the drive signal by 90 degrees. The amplified position signal produced by preamplifier 102 is in phase with the driving force and, therefore, also lags the drive voltage signal by 90 degrees. The amplified position signal produced by preamplifier 102 can be integrated before it is transmitted to conduit drive 104 to eliminate the phase shift between the amplified position signal and the drive signal. The integration can be accomplished in either of two fashions. First, the amplified position signal produced by the preamplifier 102 can be integrated by an integrator 146. Integrator 146 receives the amplified position signal along lines 148 and 150 and supplies the integrated position signal to conduit drive 104 along line 152. Alternately, conduit drive 104 can receive the integrated position signal from switched capacitor integrator 108 along line 154. Similar compensation can be provided if acceleration, rather than displacement or velocity, sensors are employed.

Figure 11:
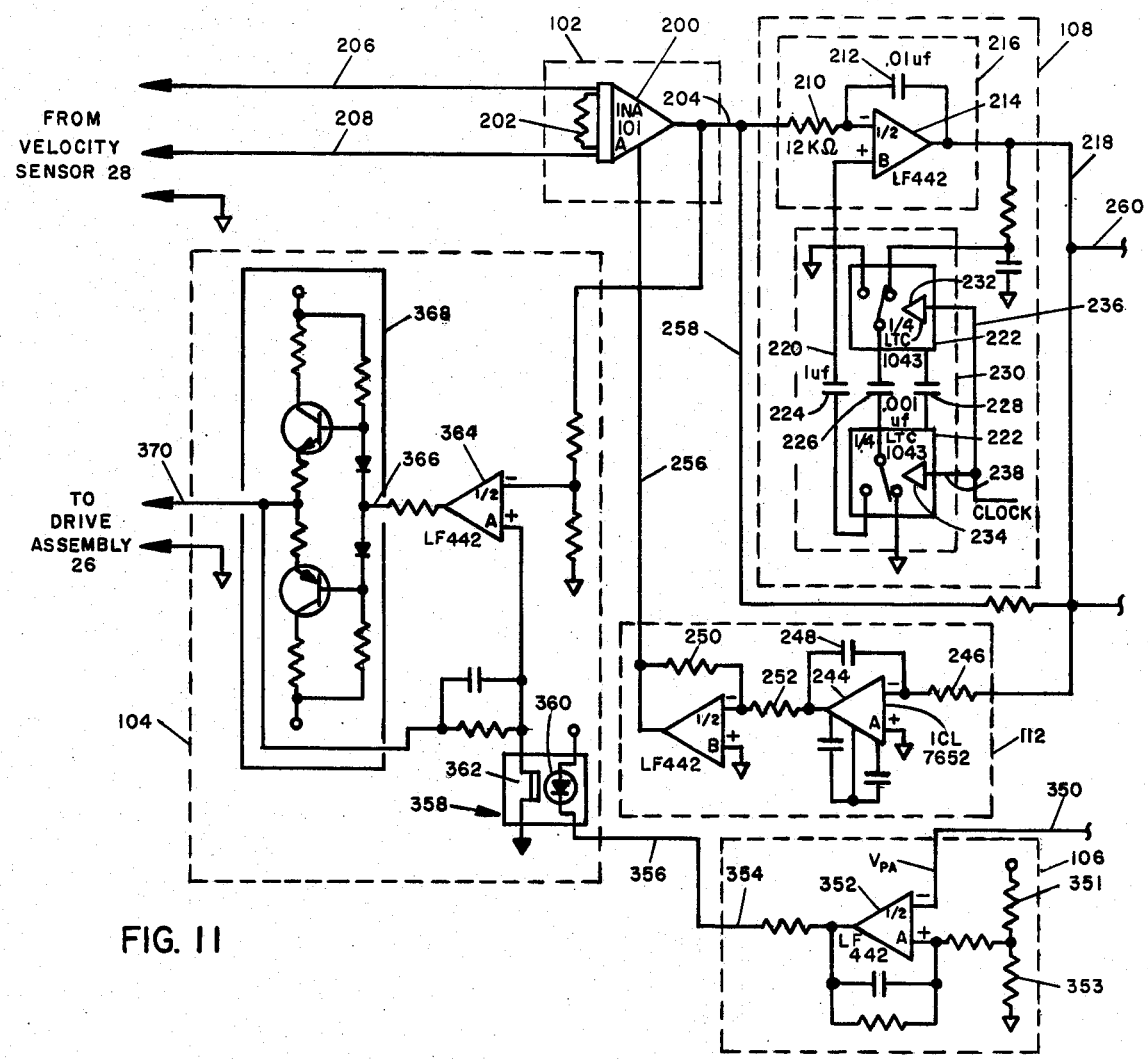
FIGS. 11 through 15 present schematic representations of the details of circuits, that are particularly useful for implementing the system shown in FIG. 9.
Figure 16:
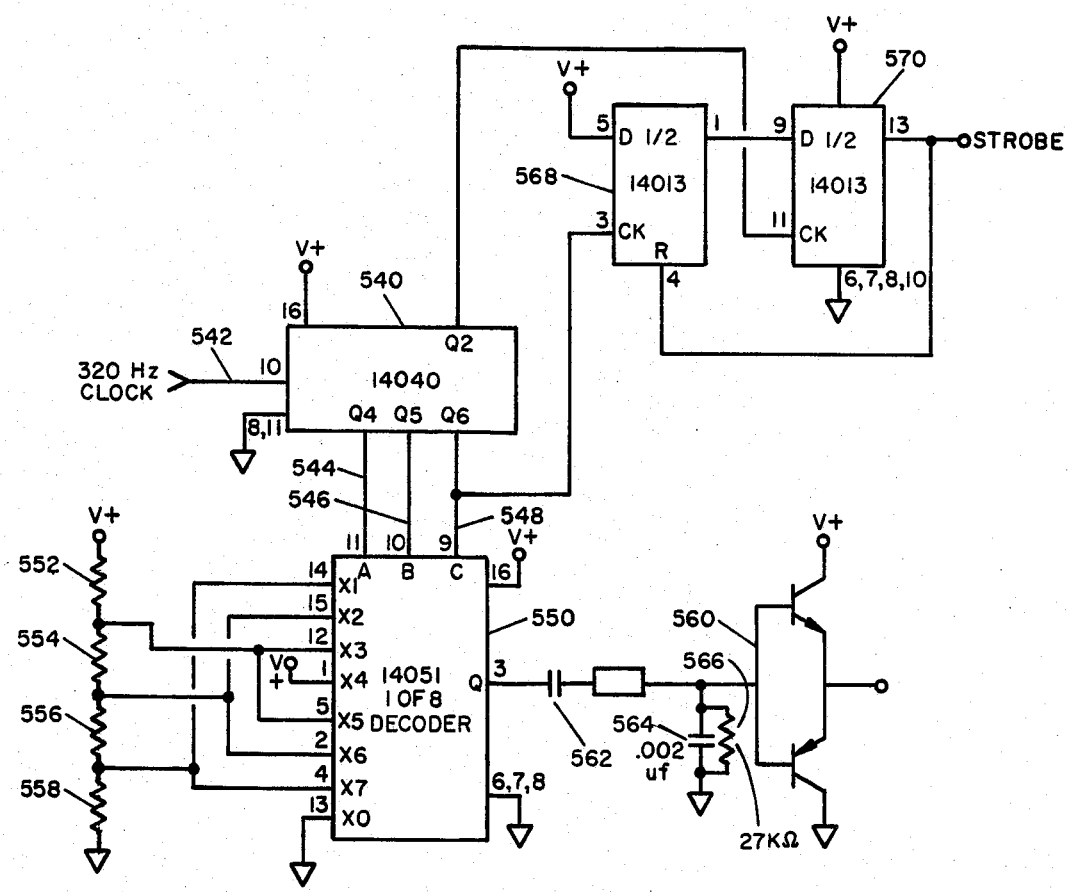
FIG. 16 presents in schematic form the details of an LVDT drive circuit.

Use of LVDTs rather than velocity sensors would require several changes to the circuits shown in FIGS. 11 and 12. FIG. 16 shows the details of an LVDT drive circuit that is useful for driving the LVDTs. A 320 kHz clock signal is applied to binary counter 540 along line 542. Binary counter 540 produces at output terminals Q4, Q5 and Q6 a twenty, ten and five kilohertz square wave, respectively. Therefore, the signals on lines 544, 546 and 548 represent a three bit binary number the value of which cycles sequentially from zero through seven. The output of counter 540 is applied to the A, B and C inputs of a decoder 550. Resistors 552, 554, 556 and 558 are connected in series between positive control voltage and ground, and constitute a voltage divider that applies different portions of the positive control voltage to the xi inputs of decoder 550. The voltage across resistor 558 is applied to the x1 and x7 inputs of decoder 550. The voltage across resistors 556 and 558 is applied to inputs x2 and x6 of decoder 550. The voltage across resistors 554, 556 and 558 is applied to the x3 and x5 inputs of decoder 550. Full positive control voltage is applied to input x4 of decoder 550. Input x0 is connected to ground. The inputs to decoder 550 at input terminals A, B and C cause decoder 550 to sequentially apply the voltages appearing at terminals x1 through x0 to its Q output. Each time a rising edge is applied to any one of terminals A, B and C, decoder 550 applies the next xi input to the Q output. As can be seen from FIG. 16, input x0 receives zero voltage since it is connected to ground. Input x4 receives full positive control voltage. Each of inputs x1 and x7 receives 15% of positive control voltage. Each of inputs x2 and x6 receives 50% of the positive control voltage. Each of inputs x3 and x5 receives 85% of the positive control voltage. Accordingly, as binary counter 540 sequentially sweeps through the values that can be assumed by its three bit output, the Q output of decoder 550 sweeps through the voltage levels appearing at its xi inputs, and a step-wise approximation of a sinusoidal signal is produced at the Q output. The voltage at x0 represents the negative peak of the cycle and the voltage at the x4 input represents the positive peak level of the cycle, with the voltages appearing at the xl through x3 and x5 through x7 inputs representing the intermediate values for the cycle. The step-wise sinusoidal signal produced by decoder 550 is capacitively coupled to the input of a complimentary pair 560 via capacitor 562. Complimentary pair 560 provides current gain and has sufficiently low impedance to drive the primary of an LVDT. Capacitor 564 and resistor 566 smooth the step-wise approximation of the sinusoid produced by decoder 550.

The 5 kHz signal appearing at the Q6 output of binary counter 540 is applied to a flip-flop 568. The 640 kHz signal produced at the Q2 output of counter 540 is applied to the clock input of a second flip-flop 570. Flip-flops 568 and 570 provide a series of pulses, or a strobe signal, the width of each of which is the period of the 640 kHz signal applied to flip-flop 570. Each pulse is timed to occur at the time of production at the Q output of decoder 550 of the voltage applied to the x4 input to decoder 550. Accordingly, a pulse occurs at the same time as the positive peak of the drive signal produced by complimentary pair 560.

Figure 17:
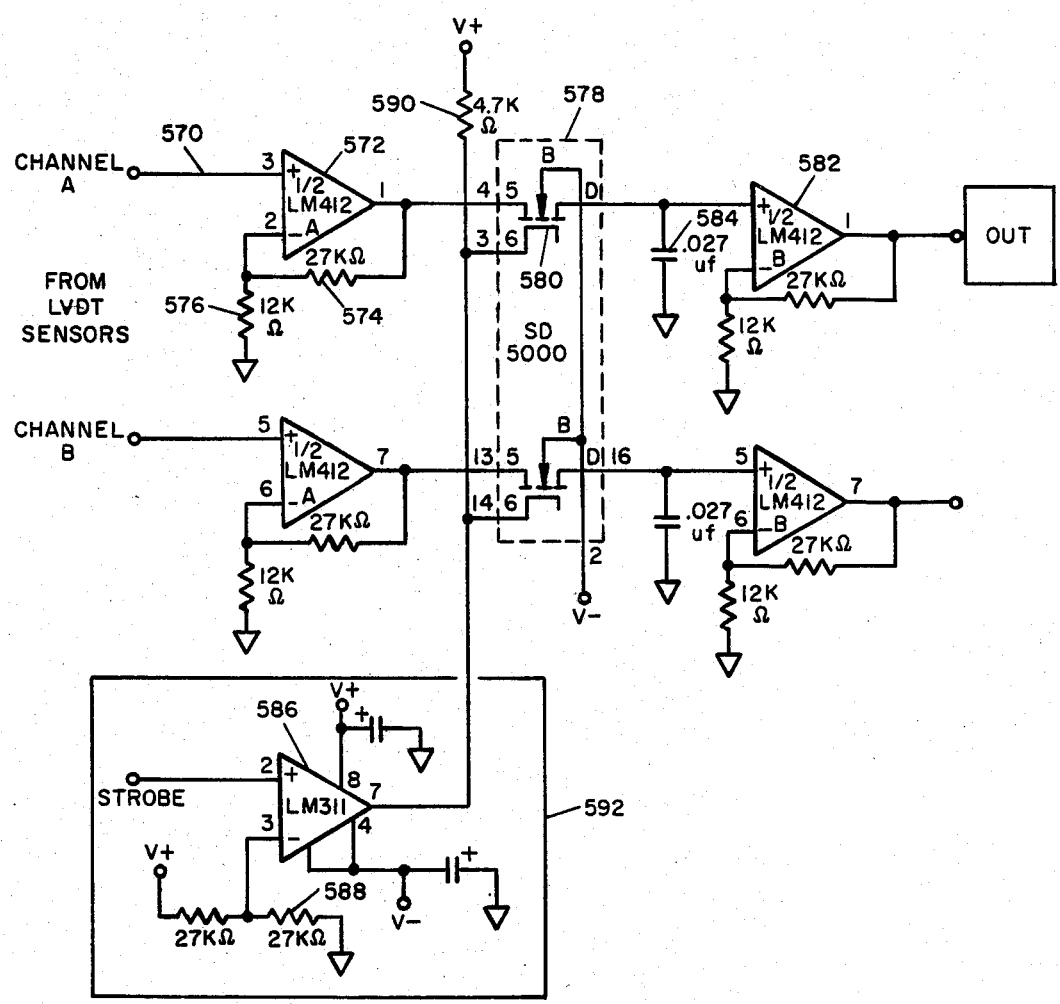
FIG. 17 presents in schematic form the details of an LVDT demodulator.

FIG. 17 shows the LVDT demodulator. Since the components for channels A and B are identical, only channel A will be described in detail. The LVDT demodulator shown in FIG. 17 receives on line 570 the sinusoidal position signal produced by an LVDT sensor. The signal on line 570 is a high frequency signal that is amplitude modulated by the position of the conduit at the point where the LVDT sensor is secured to the conduit. Accordingly, the LVDT demodulator creates a signal that corresponds to one half of the envelope of the signal appearing on line 570. The signal produced by the LVDT sensor is applied to amplifier 572 along line 570. Amplifier 572 and resistors 574 and 576 comprise a noninverting amplifier having a gain of approximately 2.5. The output of amplifier 572 is provided to the source terminal of a multiple FET switch 578. The output appearing at the drain terminal of FET 580 of FET switch 578 is fed to an amplifier 582 that has a gain of about 2.5 and whose input is held by a capacitor 584. The gate of FET 580 is controlled by the output of amplifier 586. Amplifier 586 receives the strobe signal produced by flip-flop 570 (FIG. 16). The inverting input to comparator 586 is held by resistor 588 at approximately one half the positive control voltage supply. Therefore, as a 1.6 microsecond pulse is received by the noninverting input to comparator 586, the output of comparator 586 is pulled from minus control voltage, where it is normally held by resistor 590, to plus control voltage. FET 580 turns on and the input applied to channel A is amplified by approximately 2.5 and capacitor 584 charges to the voltage appearing at the output of amplifier 572. At the end of the 1.6 microsecond pulse, FET 580 is turned off and capacitor 584 retains its charge. The voltage on capacitor 584 is multiplied by the gain of amplifier 582 and remains at that level until the next pulse is received by amplifier 586. Circuit 592 also comprises a level translator which permits the use of CMOS levels.

The operation and nature of channel B are identical to those of channel A. The output of the LVDT demodulator represents the periodic position signals corresponding to conduit movement and are applied to preamplifiers 102 and 140 shown in FIG. 9.

Particularly suitable commercially available circuit components are identified by the manufacturer's part number and suggested values for a number of the circuit elements are presented in the drawing.

It should be noted that the circuitry shown by FIGS. 13, 14 and 15 could be replaced by a suitably programmed general purpose microprocessor.

Figure 31:
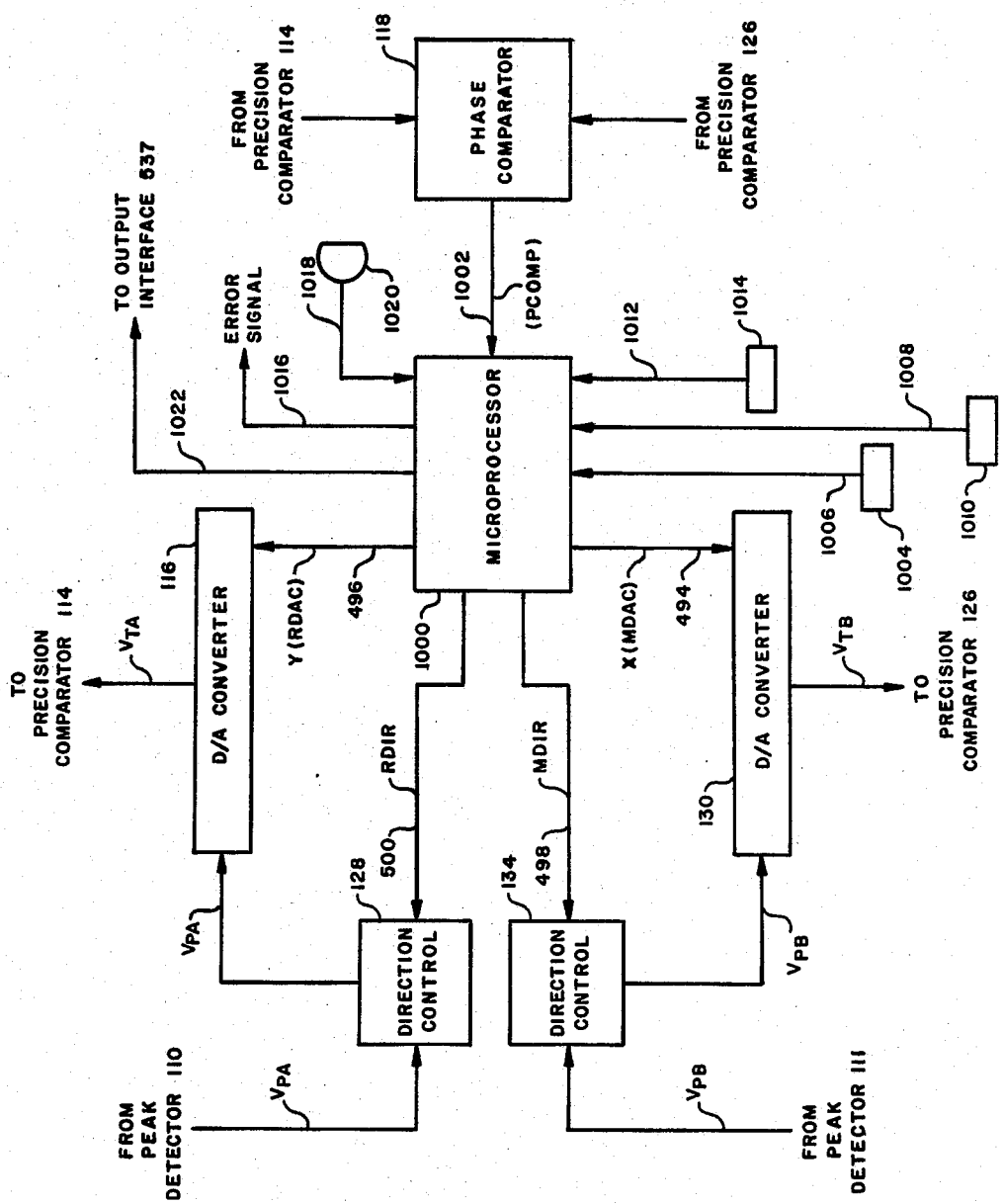
FIG. 31 shows a portion of a system including microprocessor 1000.
Figure 32:
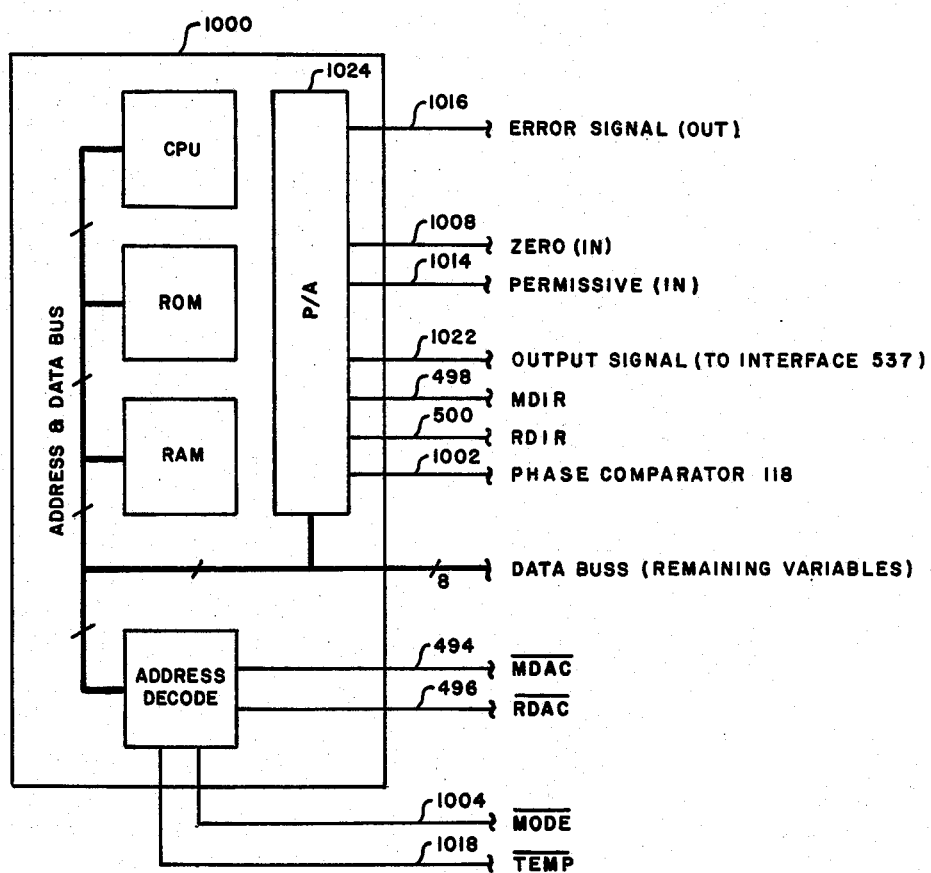
FIG. 32 is a block diagram representation of microprocessor 1000.

Further, latch 132, digital counter 120, ROM 122 and auto zero 142 can be replaced by any suitably programmed general purpose microprocessor. FIGS. 21 through 30 present a flow diagram representation of a suitable computer program for the microprocessor. FIG. 31 shows the microprocessor or controller board 1000, which is operated by the program depicted in FIGS. 21 through 30, along with its outputs and those components of system 100 (FIG. 9) with which microprocessor 1000 communicates. The system shown in FIG. 31 together with those components of FIG. 9 not represented in FIG. 31 shall be referred to herein as system 2000. FIG. 32 shows the details of microprocessor 1000.

Microprocessor 1000 receives the output of phase comparator 118, which is a series of commands to either increase or decrease the measurement count signal, along line 1002. The signal produced by phase comparator 118 along line 1002 determines whether the program will increase or decrease X, the measurement count signal. Microprocessor 1000 also receives a two digit (decimal) mode signal from a manual mode switch 1004 along line 1006. The mode signal determines under which of a number of modes the program will operate. Thus, the mode of operation of the program is established by appropriate manipulation of the mode switch. Microprocessor 1000 receives along line 1008 a zero signal that is generated by a zero switch 1010 when zero switch 1010 is actuated. The zero signal causes a new Y, the latched count signal, to be calculated and used by the program. As is described above, the latched count signal represents the no flow offset of meter 10 due to mechanical and electrical noise. The latched count signal causes the measurement count signal to be zero under a no flow condition. Thus, a zero calculation - that is, a new determination of the no flow offset - is performed when the zero switch is actuated and the permissive switch is properly set. Microprocessor 1000 receives a permit signal along line 1012 from the permissive switch 1014. Permissive switch 1014 can be any suitable switch that causes the permit signal to assume a first state when it is appropriate to calculate a new Y, and a second state when it is not appropriate to calculate a new Y. The program will not establish a new latched count signal when the permit signal is in its second state. Permissive switch 1014 can be a simple manual switch or an automatically actuable flow sensor that permits establishing a new value for Y upon the closing of a valve that forces to zero the flow through meter 10. Microprocessor 1000 produces along line 1016 an error signal having a value that depends on the nature of the error that caused generation of the error signal. Microprocessor 1000 receives along line 1018 a temperature signal from a temperature sensor 1020. Temperature sensor 1020 is disposed against the wall of conduit 12 and, thus, monitors the temperature of conduit 12. The value of the temperature signal on line 1018 varies with the temperature sensed by temperature sensor 1020. The temperature signal causes the program to modify its output in accordance with the temperature, and, therefore, the modulus of elasticity, of conduit 12. Microprocessor 1000 produces on line 1022 an output signal. The output signal represents the measurement count signal modified to reflect the effects of conduit 12 temperature sensed by temperature sensor 1020. The output signal is transmitted to binary rate multipliers 530, 532 and 534 of output interface 537 (FIG. 15) along line 1022. The twelve bit output signal is supplied to binary rate multipliers 530, 532 and 534, which determine the frequency of the output of binary counter 536, as is described above. Accordingly, the frequency, $f_o'$, of the output of binary counter 536 can be expressed as follows:

$$f_o' = \frac{f_i \text{ (output signal)}}{4096} \quad (36)$$

where $f_i$ is 1 megahertz, the frequency of the clock signal received by interface 537, and the output signal is a function of X, the measurement count signal, and the temperature signal produced by temperature sensor 1020.

The following variables are used by the program:

MODE: MODE is an eight bit variable that derives its value from the two digit (decimal) mode signal established by mode switch 1004. The eight bits of MODE have the following significance:

bits zero and one indicate one of four minimum values for the RESULT variable (which corresponds generally to the measurement count signal), below which the program will produce an indication that there is zero flow through meter 10.

bits two and three can be used by any suitably designed TEST subroutine.

bit four indicates whether the MCOUNT variable (which corresponds generally to the measurement count signal) should be incremented or decremented by a value more than one for each command produced by phase comparator 118.

bit five indicates whether the output signal should reflect compensation for the temperature sensed by temperature sensor 1020.

bit six indicates whether temperature compensation should be accomplished using double resolution.

bit seven indicates whether the program should execute a test or normal measurement.

MCOUNT: MCOUNT is a sixteen bit variable that is used by the program to represent the mass flow rate of the fluid flowing through meter 10. MCOUNT is incremented or decremented each time a command is received from phase comparator 118. Bits zero through 11 of MCOUNT correspond to the magnitude of the mass flow rate and bit 15 represents the direction in which fluid is flowing through meter 10.

MDAC: MDAC is a sixteen bit variable, bits zero through 11 of which correspond to bits zero through 11 of MCOUNT. MDAC is supplied to D/A converter 130 and represents X, the measurement count signal.

MDIR: MDIR is an eight bit variable, bit zero of which is applied to direction control 134 and represents the direction signals, or the direction in which fluid is flowing through meter 10.

RCOUNT: RCOUNT is a sixteen bit variable that is used by the program to represent the zero flow offset of meter 10. Bits zero through 11 represent the magnitude of the offset and bit 15 represents the sign of the offset.

RDAC: RDAC is a sixteen bit variable, bits zero through 11 of which correspond to bits zero through 11 of RCOUNT. RDAC is applied to D/A converter 116 and represents Y, the latched count signal.

RDIR: RDIR is an eight bit variable, bit zero of which is applied to direction control 128 and represents the latched direction signals, or the direction of the zero flow offset of meter 10.

XCOUNT: XCOUNT is a sixteen bit variable upon which the ABSOLUTE VALUE subroutine operates. The program employs XCOUNT to represent either MCOUNT or RCOUNT when it is executing the ABSOLUTE VALUE subroutine.

XDAC: XDAC is a sixteen bit variable whose value is established by the ABSOLUTE VALUE subroutine. The ABSOLUTE VALUE subroutine causes XDAC to assume either bits zero through 11 of XCOUNT or the two's complement of bits zero through 11 of XCOUNT, depending on the direction represented by bit 15 of XCOUNT. Accordingly the variables (MDAC or RDAC) that receive the values assigned to XDAC can be interpreted by D/A converters 116 or 130 as positive numbers.

XDIR: XDIR is an eight bit variable that is produced by the ABSOLUTE VALUE subroutine. The ABSOLUTE VALUE subroutine causes XDIR to assume the value of bit 15 of XCOUNT. Therefore, XDIR represents the direction of fluid flow through meter 10, if XCOUNT derived its value from MCOUNT for an execution of the ABSOLUTE VALUE routine, or the sign of the zero flow offset of meter 10, if the value of XCOUNT was derived from RCOUNT.

ZERO: ZERO is an eight bit variable used to indicate whether a new zero calculation was requested through zero switch 1010. That is, ZERO indicates whether a new zero flow offset, or RCOUNT, calculation has been requested.

AVE: AVE is an eight bit variable, bit zero of which is used to indicate whether a new zero flow offset calculation has been requested and not yet performed.

STEM: STEM is an eight bit variable that indicates whether the permissive switch 1014 has been set to permit a new zero flow offset calculation.

T: T is an eight bit variable used by the ZERO subroutine as a timer that establishes a time delay following a request for a new zero flow offset calculation of approximately 255 (1/f-conduit) seconds, where $f_{conduit}$ is the frequency of vibration of conduit 12.

M: M is an eight bit variable that is used by the MODE subroutine. M is used as a counter, or timer, that permits the mode switch to mechanically settle before a new value for MODE is derived from the mode switch.

LMODE: LMODE is an eight bit dummy variable used by the MODE subroutine.

NMODE: NMODE is the eight bit variable that receives the mode signal from the mode switch 1004 and which, therefore, represents the operating parameters of the program that are presently desired. NMODE is used by the MODE subroutine.

PCOMP: PCOMP is an eight bit variable that represents the commands generated by phase comparator 118 and, therefore, indicates whether MCOUNT should be incremented or decremented.

UP: UP is an eight bit dummy variable used by the ACCELERATOR subroutine to register the number of consecutive increments of MCOUNT commanded by phase comparator 118.

DWN: DWN is an eight bit dummy variable used by the ACCELERATOR subroutine to register the number of consecutive decrements of MCOUNT commanded by phase comparator 118.

SNAFU: SNAFU is an eight bit variable used to indicate the existence and nature of errors occurring during operation of the program.

DFAC: DFAC is an eight bit dummy variable used by the MASS subroutine. The value of DFAC is used to modify the value of MDAC, to achieve RESULT, when temperature compensation is not requested. The value of DFAC is usually one.

FAC: FAC is an eight bit variable that assumes the value of DFAC or the temperature compensation factor (TFAC) if temperature compensation is requested. FAC is multiplied by MDAC to achieve RESULT.

TEMP: TEMP is an eight bit variable that is produced by temperature sensor 1020. TEMP is used by the MASS subroutine.

TFAC: TFAC is an eight bit variable whose value is derived from a temperature table. The appropriate location of the temperature table is accessed using the TEMP variable.

RESULT: RESULT is a sixteen bit variable that is used to generate output signal. RESULT represents a temperature compensated value of MCOUNT, if temperature compensation was requested.

J: J is an eight bit dummy variable used by the AVE subroutine as a counter.

N: N is an eight bit variable used by the AVE subroutine as a counter.

AVG: AVG is a sixteen bit variable used to accumulate 128 successive readings of MCOUNT to determine when an appropriately valued RCOUNT has been established during a new zero flow calculation.

FIG. 32 shows the configuration of microprocessor 1000. The configuration of microprocessor 1000 is conventional and the operation of its components shown in FIG. 32 will be readily apparent to those of ordinary skill in the art.

Figure 21:
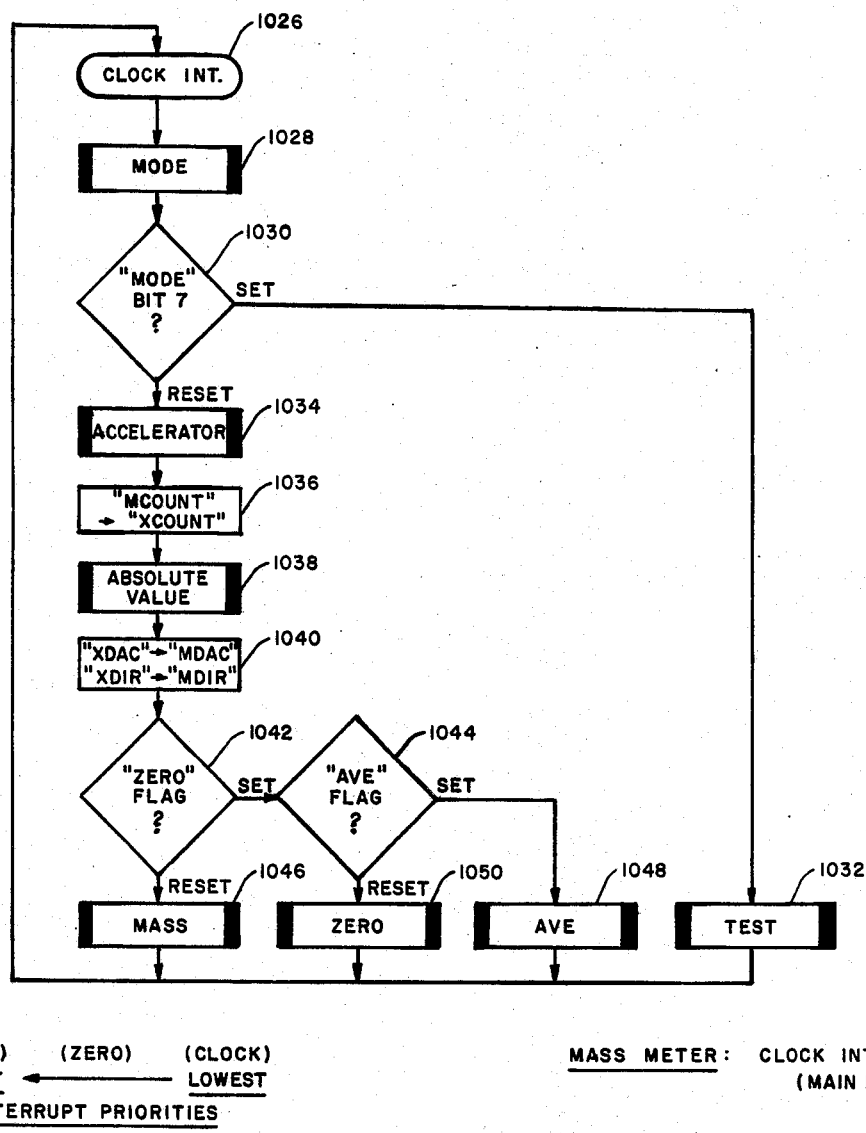

At any time, the program operates in one of three MAIN routines, the MAIN routine, shown in FIG. 21, the ZERO routine, shown in FIG. 22 and the POWER routine, shown in FIG. 23. The operation of each routine is initiated by a program interrupt. The CLOCK interrupt initiates performance of the MAIN routine. The ZERO interrupt initiates performance of the ZERO routine. The POWER interrupt initiates performance of the POWER routine. The POWER interrupt has the highest priority and the CLOCK interrupt has the lowest priority. A CLOCK interrupt is generated each time a command is generated by phase comparator 118 (a command is generated by phase comparator 118 for each oscillation of conduit 12). When phase comparator 118 applies a command to microprocessor 1000 along line 1002, the program either increments or decrements MCOUNT in accordance with the nature of the command.

Upon generation of a CLOCK interrupt, at block 1026, the MAIN routine executes the MODE subroutine at 1028. As is explained in more detail below, the MODE subroutine determines whether MODE switch 1004 has been altered to request a new mode of operation of the program. Block 1030 tests bit seven of MODE, which is established by the MODE subroutine when a request for a new mode of operation is established at mode switch 1004, to determine whether a normal run or a test run should be made. If bit seven is set, a test run is performed at 1032. The nature of the TEST subroutine is not specified in this application, but can be any suitable subroutine that tests the program. If bit seven is reset, the ACCELERATOR subroutine is performed at 1034. As is explained in more detail below, the ACCELERATOR subroutine increments or decrements MCOUNT in accordance with the commands received by microprocessor 1000 from phase comparator 118. Block 1036 moves the value of MCOUNT, which is the present value of the measurement count signal, into the dummy variable XCOUNT. The ABSOLUTE VALUE subroutine is performed at block 1038. In this case, the ABSOLUTE VALUE subroutine places in XDAC bits zero through 11 of MCOUNT and places in XDIR bit 15 of MCOUNT. Block 1040 moves the value of XDAC to MDAC and the value of XDIR to MDIR. Accordingly, MDAC represents the magnitude of the mass flow rate (that is, X, the measurement count signal) and MDIR represents the direction in which fluid flows through meter 10 (that is, the direction signal).

Block 1042 checks the ZERO variable. If ZERO is set, the program proceeds to block 1044. If ZERO is reset, the MASS subroutine is performed at 1046. As is explained in greater detail below, the MASS subroutine modifies the measurement count signal in accordance with the temperature provided by temperature sensor 1020, if temperature compensation is requested. If ZERO is set, a recalculation of RCOUNT, to recalculate the zero flow offset, has been requested, and, if both permitted by permissive switch 1014 and AVE is reset, is performed. If ZERO is set, AVE is checked at 1044. If AVE is reset, the ZERO subroutine has not been performed since the request for a recalculation of the zero flow offset and the ZERO subroutine is performed at 1050. As is explained in more detail below, the ZERO subroutine provides a coarse adjustment to RCOUNT, that is, it causes RCOUNT to assume a value that is close to the zero flow offset of meter 10 under a zero flow condition. If the AVE flag is set, the ZERO subroutine has been performed subsequent to the most recent request for a new zero flow offset calculation and the AVE subroutine is performed at 1048. As is explained in more detail below, the AVE subroutine provides a fine adjustment of RCOUNT to more accurately reflect the zero flow offset of meter 10.

FIG. 22 shows the ZERO routine. A ZERO interrupt is generated at 1052 each time zero switch 1010 is actuated to indicate that a new calculation of RCOUNT is required pursuant to a request for a recalculation of the zero flow offset for meter 10. When the program is operating in the MAIN routine and a ZERO interrupt is generated, the program immediately transfers to block 1052. The program then reads the STEM variable that is generated by permissive switch 1014 at 1054. If STEM is set, the status of the permissive switch indicates that a new calculation of RCOUNT is permissible, preferably meaning that there is, in fact, no flow through meter 10, and the program proceeds from block 1056 to block 1058. If STEM is reset, a new calculation of the zero flow offset of meter 10 is inappropriate and the program returns to the MAIN routine. If calculation of a new zero flow offset is permissible, block 1058 transfers to XCOUNT the current value of RCOUNT, which is stored in electronically erasable programmable read only memory ("EEPROM"). The ABSOLUTE VALUE subroutine, at 1060, operates on XCOUNT to transfer the contents of bits zero through 11 of XCOUNT, which represent the present magnitude of the offset, to XDAC and the contents of bit 15 of XCOUNT, which represents the sign of the offset, to XDIR. Block 1062 transfers the value of XDAC to RDAC and the value of XDIR to RDIR. Accordingly, RDAC and RDIR contain the magnitude and sign, respectively, of the offset represented by RCOUNT. Block 1064 sets ZERO to cause the program to execute the ZERO subroutine on its next pass through the MAIN routine, and sets T equal to zero to initialize that timer for use in the ZERO subroutine. The program exits the ZERO routine at 1066.

FIG. 23 shows the POWER routine. A POWER interrupt is generated each time power is applied to meter 10, either initially, or subsequent to temporary power loss. Upon generation of a POWER interrupt at 1068, the program transfers immediately to block 1070. Block 1070 transfers a zero to variable M to ensure that M is initialized when the program performs the MODE subroutine upon its next pass through the MAIN routine. The value 80 (hexadecimal) is transferred to MODE and the value zero (hexadecimal) is transferred to LMODE to ensure that the MODE subroutine transfers to MODE the values established by mode switch 1004. The program initializes PIA 1024 at block 1072 and prepares the program for operation by initializing all counters and registers, to ensure a proper and orderly start-up when power is either supplied or restored to meter 10. Blocks 1074, 1076 and 1078 transfer the contents of the RCOUNT EEPROM to RDAC and RDIR. The program, at block 1074, transfers the value stored by the RCOUNT EEPROM to XCOUNT. The ABSOLUTE VALUE subroutine, at 1076, sets the values of XDAC and XDIR to correspond to the magnitude and sign of the zero flow offset indicated by the present value of RCOUNT. Block 1078 transfers the values of XDIR and XDAC to RDIR and RDAC, respectively. Establishing proper values for RDAC and RDIR is necessary to ensure that proper signals are transferred by microprocessor 1000 to direction control 128 and D/A converter 116 along lines 500 and 496, respectively. The program exits the POWER routine at 1080.

Figure 24:
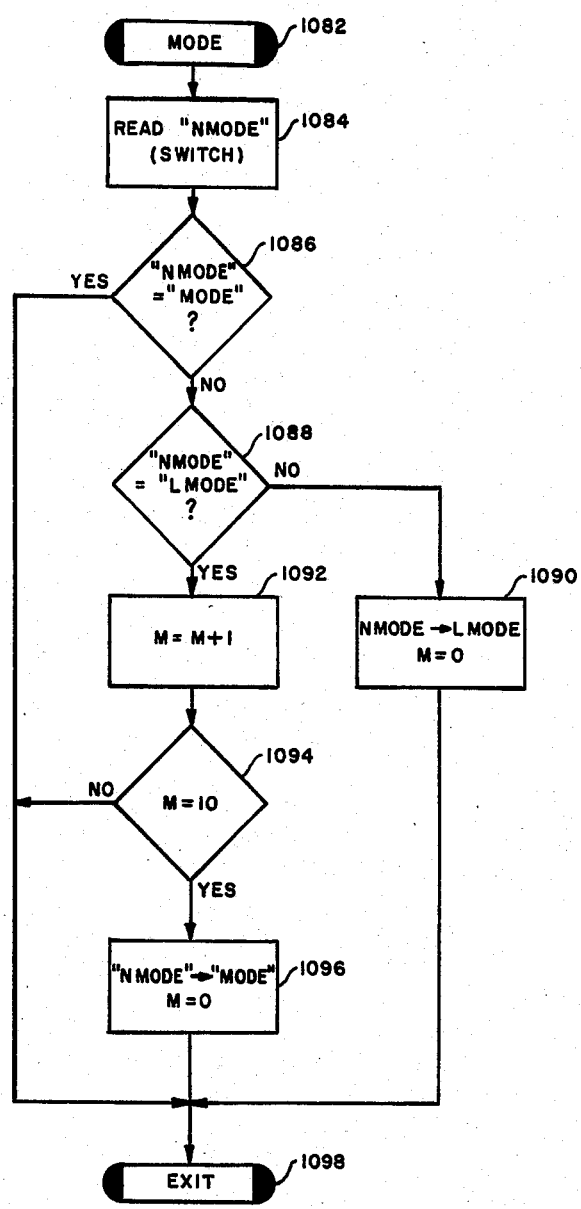

FIG. 24 shows the MODE subroutine. The MODE subroutine reads the mode switch and determines whether a change in mode has been requested. If a change in mode has been requested, the MODE subroutine establishes a waiting period during which the program allows mode switch 1004 to mechanically settle before a new mode is established by updating the value of MODE. If another new mode is requested through mode switch 1004 during the waiting period, the waiting period is restarted to enable the mode switch 1004 to mechanically settle again. Once a waiting period has been completed, the new mode value determined by mode switch 1004 is transferred to MODE.

The MODE subroutine is entered at block 1082. Block 1084 reads mode switch 1004 and transfers the mode signal produced by mode switch 1004 to the NMODE variable. Block 1086 compares NMODE to MODE, which has a value that established the mode of operation under which the program is presently operating. If NMODE is equal to MODE, there has not been a request for a new mode of operation and the program returns to the MAIN routine. If NMODE does not equal MODE, a request has been made for a new mode of operation, in which case block 1088 compares NMODE to LMODE. The LMODE variable is a dummy variable that will not be equal to NMODE on the first pass the program makes through the MODE subroutine following a request for a new mode of operation. If LMODE is not equal to NMODE, block 1090 transfers the value of NMODE to LMODE to ensure that the proper branch from block 1088 will be followed during the next pass the program makes through the MODE subroutine. Block 1090 also sets the M variable equal to zero to establish the beginning of the waiting period. The program then transfers to the MAIN routine through block 1098. During the next pass of the program through the MAIN routine, block 1028 again transfers the program to the MODE subroutine at 1082. During this pass, block 1088 transfers the program to block 1092 since the program set NMODE equal to LMODE during the previous pass of the program through the MODE subroutine. Block 1092 increments the variable M by one. Block 1094 determines whether M is equal to 10. If M is not equal to 10, the waiting period is not over and the program returns to the MAIN routine. The program will cycle through the MAIN routine and the MODE subroutine until M is equal to 10, at which time the waiting period has terminated and block 1094 transfers the program to block 1096. Block 1096 transfers the value of NMODE to MODE to establish the new mode of operation for the program. Block 1096 also sets M equal to zero to initialize M for the next execution of a change of mode operation. The program exits the MODE subroutine at block 1098.

Figure 25:
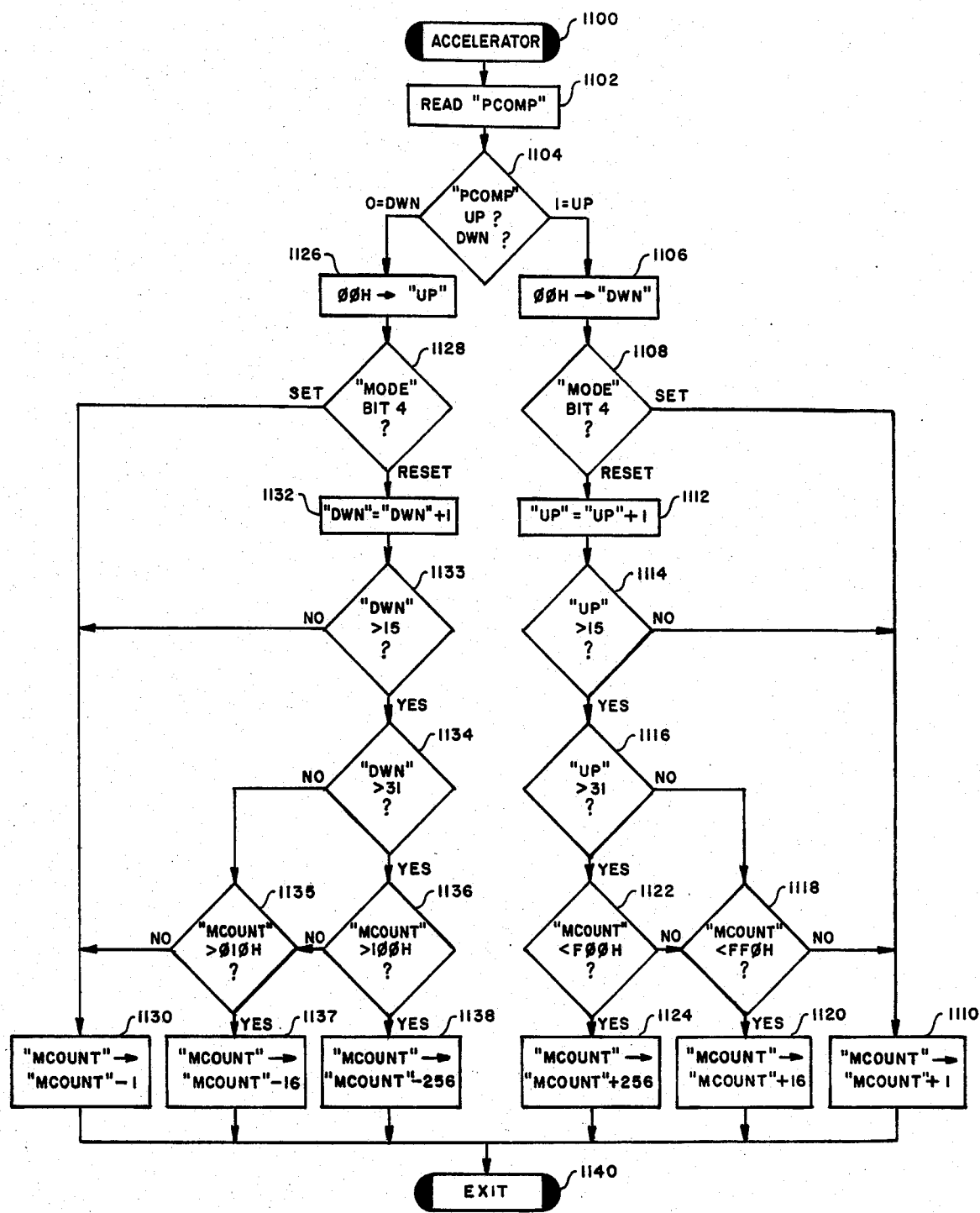

FIG. 25 shows the ACCELERATOR subroutine. The ACCELERATOR subroutine increments MCOUNT pursuant to a command received from phase comparator 118 to increase or decrease the measurement count signal. Further, the incrementing or decrementing of MCOUNT can be accelerated if a predetermined number of consecutive commands to increment or decrement are received by microprocessor 1000. Upon receipt of the sixteenth consecutive command to increase the measurement count signal, the ACCELERATOR subroutine begins to increment MCOUNT by sixteen counts rather than one upon receipt of each command until microprocessor 1000 receives a command to decrease the measurement count signal. Upon receipt of the thirty-second consecutive command to increase the measurement count signal, the ACCELERATOR subroutine begins to increment MCOUNT by 256 and continues to increment MCOUNT by 256 for each command to increase the measurement count signal until microprocessor 1000 receives a command to decrease the measurement count signal. Similarly, receipt of sixteen consecutive commands to decrease the measurement count signal causes the ACCELERATOR subroutine to decrement MCOUNT by sixteen, rather than by one; and receipt of thirty-two consecutive commands to decrease the measurement count signal causes the ACCELERATOR subroutine to decrement MCOUNT by 256, rather than by one or sixteen, until a command is received to increase the measurement count signal.

The program enters the ACCELERATOR subroutine at 1100. Block 1102 reads the PCOMP variable, which receives its value from the commands microprocessor 1000 receives from phase comparator 118. The value of PCOMP may be changed each time microprocessor 1000 receives a command from phase comparator 118, depending on the nature of the command. If microprocessor 1000 receives a command from phase comparator 118 to increase the measurement count signal, the value "1" is written to PCOMP. Alternately, if microprocessor 1000 receives a command from phase comparator 118 to decrease the measurement count signal, a "0" is written to PCOMP. Block 1104 determines whether MCOUNT should be incremented or decremented. If PCOMP is equal to one, MCOUNT will be incremented and the program proceeds to block 1106. Block 1106 writes a zero to the DWN variable to ensure that the ACCELERATOR subroutine will begin properly counting consecutive commands to decrease the measurement count signal upon receipt by microprocessor 1000 of the next command from phase comparator 118 to decrease the measurement count signal. Block 1108 determines whether accelerated incrementing is desired by examining bit 4 of MODE. If bit four of MODE is set, acceleration is not desired and the program proceeds to block 1110, which increments MCOUNT by one. If bit four of MODE is reset, acceleration is desired and the program proceeds to block 1112. Block 1112 increments UP by one. UP was initialized to zero by the most recent command to decrease the measurement count signal. Thus, the first command to increase the measurement count signal will cause the program, at block 1112, to increase UP to one. Block 1114 determines whether UP is greater than fifteen. If UP is not greater than fifteen, the number of consecutive commands to increase the measurement count signal received by microprocessor 1000 is insufficient to warrant accelerated counting, and the program proceeds to block 1110, which increments MCOUNT by one. If UP is greater than fifteen, acceleration is warranted and the program checks at 1116 whether UP is greater than thirty-one. If UP is not greater than thirty-one, microprocessor 1000 has received a number of consecutive commands to increase the measurement count signal that is insufficient to warrant accelerated counting by 256, but that is sufficient to warrant accelerated counting by sixteen. The program proceeds to block 1118, where the program determines whether the value of MCOUNT is so high that an overflow condition will occur if the program increments MCOUNT by sixteen. If MCOUNT is greater than or equal to FF0 (hexadecimal), 4080 (decimal), incrementing MCOUNT by sixteen would cause MCOUNT to exceed the system limit of 4095, and the program proceeds to block 1110, where MCOUNT is incremented by one. If MCOUNT is less than FF0 (hexadecimal), block 1118 causes the program to proceed to block 1120, where MCOUNT is increased by sixteen.

If block 1116 determines that UP is greater than thirty-one, the program should increment MCOUNT by 256. However, the program proceeds to block 1122 to determine whether MCOUNT is less than F00 (hexadecimal), 3840 (decimal). If MCOUNT is less than 3840 (decimal), 256 can be added to MCOUNT without exceeding the system limit of 4095 and the program proceeds to block 1124 to increment MCOUNT by 256. If MCOUNT is greater than or equal to 3840, adding 256 to MCOUNT will cause MCOUNT to exceed 4095 and, therefore, MCOUNT is not incremented by 256, and the program proceeds to block 1118. As is explained above, the program determines at block 1118 whether sixteen or one should be added to MCOUNT.

If block 1104 determines that PCOMP is equal to zero, the measurement count signal should be decreased and the program proceeds to block 1126. Block 1126 transfers zeros to UP to ensure that the ACCELERATOR subroutine will perform properly upon the next receipt by microprocessor 1000 of a command from phase comparator 118 to increase the measurement count signal. Block 1128 determines whether accelerated counting is desired by examining bit four of MODE. If bit four is set, acceleration is not desired and the program proceeds to block 1130, which decrements MCOUNT by one. If bit four is reset, the program proceeds to block 1132. Blocks 1128, 1130 and 1132 through 1138 operate in the same manner as that in which blocks 1108, 1110, 1112, 1114, 1116, 1118, 1120, 1122 and 1124 operate to decrement MCOUNT by one, sixteen, or 256, depending on the number of consecutive commands to decrease the measurement count signal that microprocessor 1000 has received from phase comparator 118, as reflected by the value of DWN. The program exits the ACCELERATOR subroutine at block 140 to return to the MAIN routine.

Figure 26:
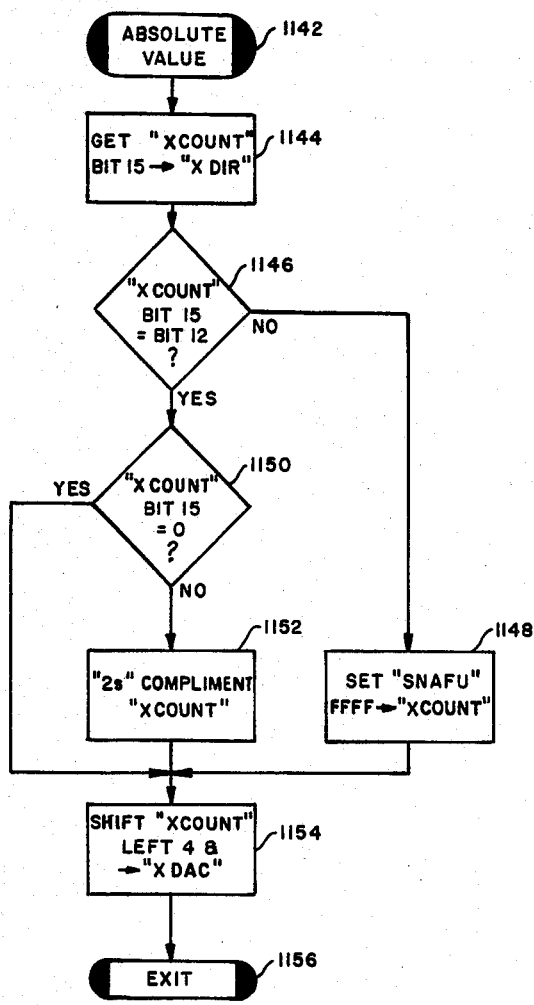

FIG. 26 shows the ABSOLUTE VALUE subroutine. The ABSOLUTE VALUE subroutine establishes the value of XDAC. The ABSOLUTE VALUE subroutine places zeros in the four least significant bits of XDAC and places in its twelve most significant bits the twelve least significant bits of XCOUNT. XDAC is transferred, by other routines or subroutines, to MDAC or RDAC. D/A converters 116 and 130 operate on the twelve most significant bits of RDAC and MDAC, l0 respectively. The ABSOLUTE VALUE subroutine also places the most significant bit of XCOUNT into XDIR. XDIR is transferred by other routines or subroutines to either RDIR or MDIR, which are used to provide appropriate direction information to direction control 128 and 134, respectively.

The ABSOLUTE VALUE subroutine is entered at 1142. Block 1144 moves bit fifteen of XCOUNT into XDIR. Thus, if RCOUNT had been moved into XCOUNT prior to the program's entering the ABSOLUTE VALUE subroutine, XDIR would represent the sign of the zero flow offset, that is, the latched count signal. If MCOUNT had been moved into XCOUNT prior to the program's entering the ABSOLUTE VALUE subroutine, XDIR would represent the direction in which fluid is flowing through meter 10, or the sign of the measurement count signal. Block 1146 determines whether bit fifteen of XCOUNT is equal to bit twelve of XCOUNT. Since the system limit is 4095 (decimal), all counting should be done with the twelve least significant bits of MCOUNT and RCOUNT. Therefore, bits twelve, thirteen and fourteen of XCOUNT should be zero when XCOUNT represents a positive count signal. Bits twelve, thirteen and fourteen of XCOUNT should be one when XCOUNT represents a negative signal. Since bit fifteen is zero for positive count signals and one for negative count signals, bit fifteen of XCOUNT should always be equal to bit twelve of XCOUNT. Otherwise, XCOUNT represents a signal in excess of the system limit of 4095, and an overrange condition exists. If block 1146 determines that bit fifteen does not equal bit twelve, the SNAFU variable is set at a constant one. The value of the SNAFU variable is applied to line 1016 as the error signal. Block 1148 also transfers FFFF (hexadecimal) to XCOUNT, which causes output interface 537 to indicate zero mass flow rate. If bit fifteen is equal to bit twelve, an overrange condition does not exist and block 1150 determines the sign of XCOUNT. If bit fifteen of XCOUNT does not equal zero, the sign of XCOUNT is negative and block 1152 produces the two's complement of XCOUNT to ensure that a positive binary number, representing the magnitude of XCOUNT, is applied to either D/A converter 116 or 130. If bit fifteen of XCOUNT is equal to zero, XCOUNT represents a positive number and no further manipulation of XCOUNT is necessary to ensure that a positive number is applied to D/A converter 116 or 130. Block 1154 shifts XCOUNT four places to the left to transfer the twelve least significant bits of XCOUNT to the twelve most significant bits of XCOUNT. XCOUNT is then transferred to XDAC, thereby causing the four least significant bits of XDAC to be zero and the twelve most significant bits of XDAC to represent the magnitude of XCOUNT. The program exits the ABSOLUTE VALUE subroutine at block 1156. The program then returns to one of the other routines or subroutines, which moves XDIR to either RDIR or MDIR and moves XDAC to either RDAC or MDAC, depending on whether XCOUNT represented the value of RCOUNT or MCOUNT.

Figure 27:
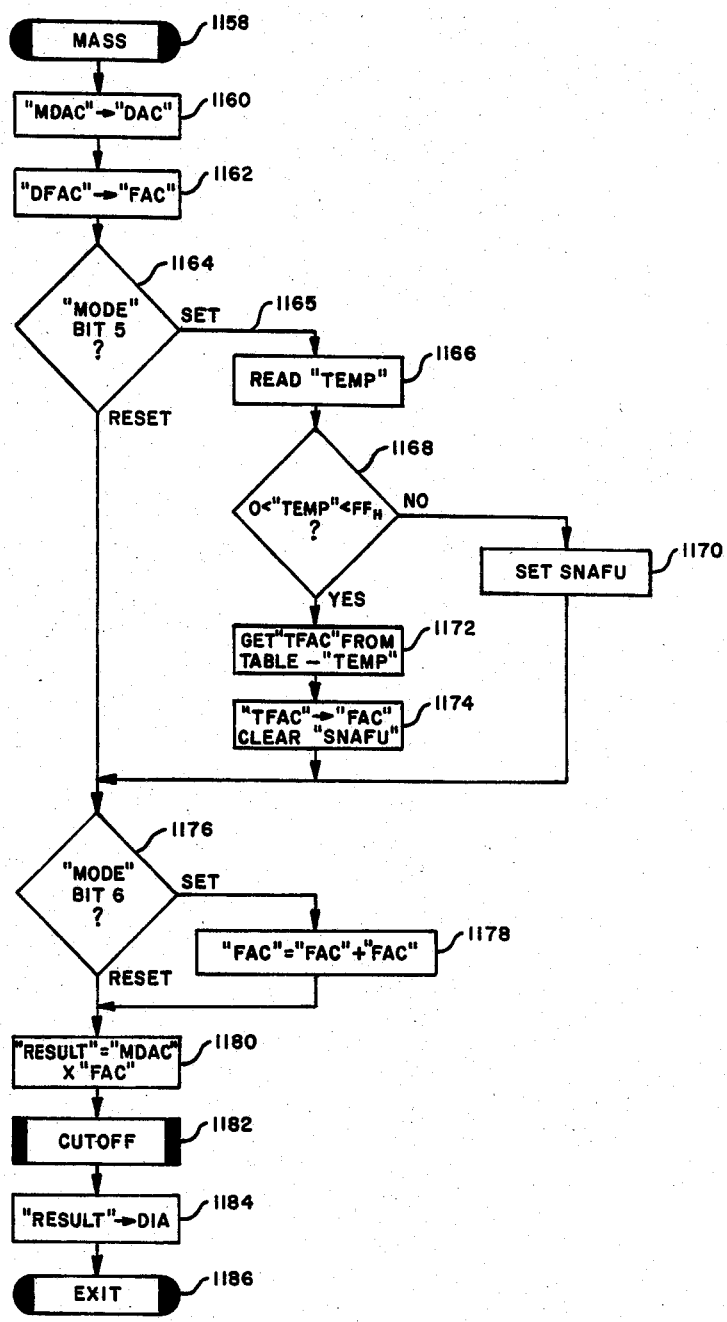

FIG. 27 shows the MASS subroutine. The MASS subroutine produces the RESULT variable, from which the output signal is generated. The MASS subroutine also provides any temperature compensation that has been requested. The program enters the MASS subroutine at block 1158. Block 1160 acquires the current measurement count signal, MDAC, and applies MDAC to D/A converter 130 along line 494. Block 1162 moves the value of DFAC to FAC. DFAC is a dummy variable, usually one. FAC is used by the MASS subroutine as a multiplier to modify the value of MDAC. The value assigned to FAC is that of DFAC if temperature compensation is not required and that of TFAC if temperature compensation is required. Block 1164 determines whether bit five of MODE is set or reset. If bit five is set, the program enters the temperature compensation branch 1165 of the MASS subroutine. Block 1166 reads the output of temperature sensor 1020. The value of TEMP must be between 00 (hexadecimal) and FF (hexadecimal). However, if TEMP is equal to either 00 (hexadecimal) or FF (hexadecimal) an overtemperature or undertemperature condition exists. Therefore, block 1168 determines whether TEMP is equal to 00 (hexadecimal) or FF (hexadecimal). If TEMP is equal to either 00 (hexadecimal) or FF (hexadecimal), the program executes block 1170, which sets SNAFU to indicate that a temperature error has occurred. If TEMP is within its proper range, the program executes block 1172, which uses the value of TEMP to access a one dimensional temperature table. The entry of the temperature table corresponding to TEMP is transferred to TFAC. The length of the temperature table is 256 to correspond with the number of values that can be assumed by TEMP. Block 1174 moves the value of TFAC to FAC and clears SNAFU to indicate that any temperature error previously occurring no longer exists. Block 1176 determines the value of bit six of MODE. If bit six is set, block 1178 doubles the value of FAC to double the resolution of temperature compensation branch 1165. If bit six is reset, resolution doubling has not been requested and block 1178 is not executed. Block 1180 uses FAC to modify the magnitude of the measurement count signal by multiplying the value of FAC by the value of MDAC and transferring the result to RESULT. If temperature compensation was not required, MDAC would have been multiplied by DFAC. If temperature compensation was requested, MDAC would have been multiplied by TFAC. Block 1182 determines whether the value of RESULT is so low that meter 10 should indicate zero flow, as is explained in more detail below. Block 1184 transmits the value of RESULT to PIA 1024, which generates the output signal that is provided to output interface 537 along line 1022, and that determines the divide rate for each binary rate multiplier of interface 537. The program exits the MASS subroutine at block 1186.

Figure 28:
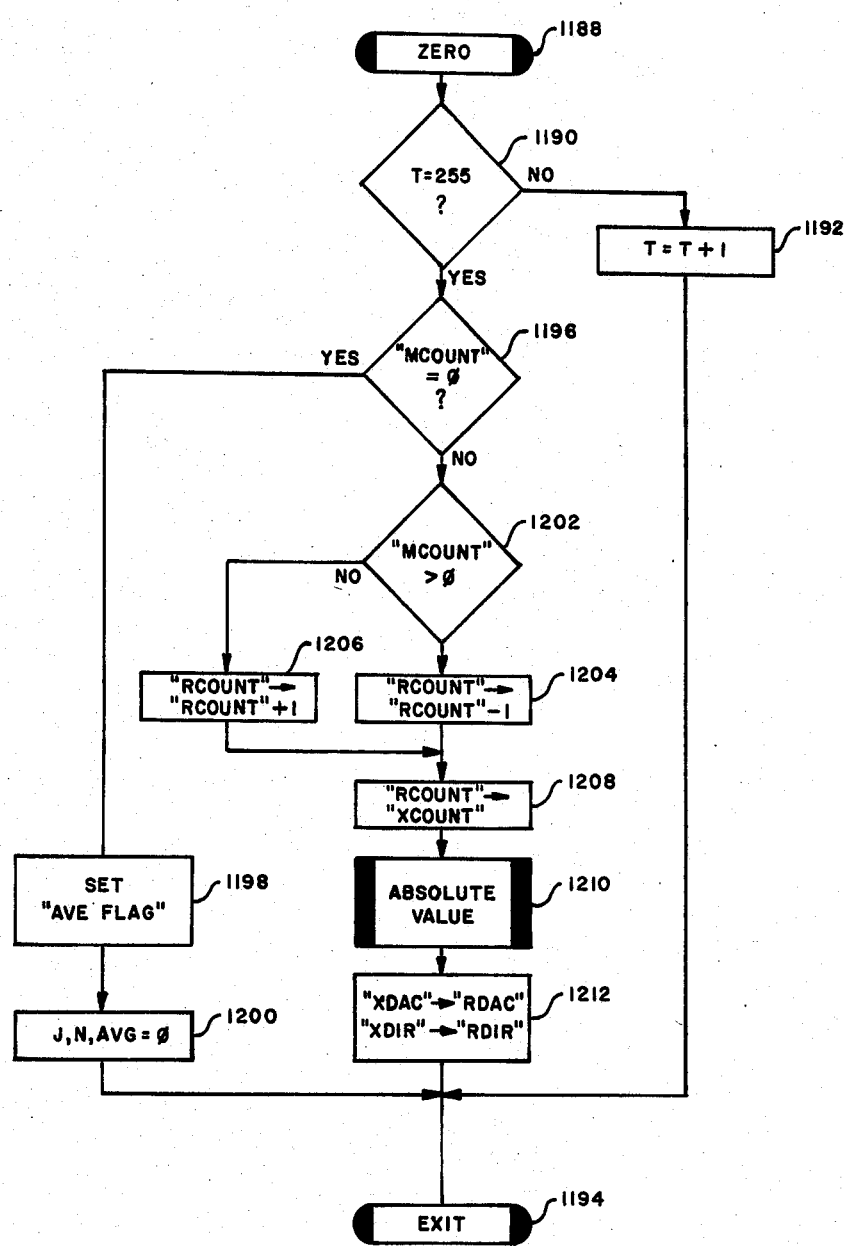

FIG. 28 shows the ZERO subroutine. The ZERO subroutine executes preliminary steps necessary for establishing a new zero flow offset by establishing a new value for RCOUNT. More specifically, the ZERO subroutine provides a coarse adjustment to RCOUNT by altering RCOUNT in such a way that the average value of MCOUNT over time is brought closer to zero under zero flow conditions. Generally, under zero flow conditions, there would normally be a nonzero measurement count signal accumulated due to mechanical noise present in the meter. The count offset would not be constant due to the time varying nature of the mechanical noise. Accordingly, the ZERO subroutine can be viewed as a coarse adjustment that reduces the variation from zero of MCOUNT over time. The AVE subroutine, described in detail below, can be considered a fine adjustment that modifies RCOUNT to move the time average of MCOUNT even closer to zero. Specifically, the ZERO subroutine alters RCOUNT until, during a pass through the ZERO subroutine, the program determines that MCOUNT is equal to zero, meaning that at that instant RCOUNT represents the actual zero flow offset. If the zero flow offset were to remain constant, no further adjustment of RCOUNT would be necessary. However, since the mechanical noise causing the zero flow offset can vary significantly, it is possible that MCOUNT's equalling zero is an anomaly, and that MCOUNT is mostly nonzero. Therefore, the AVE subroutine alters RCOUNT over time to force the average of MCOUNT to be very close to zero.

The program enters the ZERO subroutine through block 1188. Block 1190 determines whether T is equal to 255. T is a variable that is used by the ZERO subroutine as a timer. Upon receipt by microprocessor 1000 of a request for a new calculation of the zero flow offset, the program waits for a delay period equal to the time required for the program to cycle through the main routine and the ZERO subroutine 255 times. The delay period is required to permit meter 10 to mechanically settle, since meter 10 may include apparatus for mechanically forcing a zero flow condition to exist as a condition for permitting a new calculation of the zero flow offset to be made for the meter. Accordingly, if T does not equal 255, the settling delay period has not expired, block 1192 increments T by one and the program returns to the MAIN routine through block 1194. If T is equal to 255, the program has cycled through the MAIN routine and the ZERO subroutine 255 times, the delay period is over, and the program proceeds to block 1196. Block 1196 determines whether MCOUNT is equal to zero. If MCOUNT is equal to zero, the value of RCOUNT represents the zero flow offset of meter 10 at that time. Accordingly, the coarse adjustment of RCOUNT has been accomplished and block 1198 sets AVE to ensure that on the next pass through the MAIN routine, the program will be transferred to the AVE subroutine to perform the fine adjustment of RCOUNT. Block 1200 sets J, N and AVG equal to zero, all three of which are used in the AVE subroutine and must be equal to zero upon first entering the AVE subroutine. If MCOUNT does not equal zero, the coarse adjustment of RCOUNT has not been completed and the program proceeds to block 1202. Block 1202 determines whether MCOUNT is greater than zero. If MCOUNT is greater than zero, MCOUNT is too high and RCOUNT must be reduced to bring MCOUNT closer to zero. Accordingly, block 1204 decrements RCOUNT by one. If MCOUNT is not greater than zero, MCOUNT is too low and RCOUNT must be increased to bring MCOUNT closer to zero. Accordingly, block 1206 increments RCOUNT by one. Block 1208 moves the value of RCOUNT to XCOUNT to permit the new value of RDAC to be applied to D/A converter 116 and the new value of RDIR to be applied to direction control 128. Block 1210 causes the program to transfer to the ABSOLUTE VALUE subroutine, which moves the magnitude of the zero flow offset represented by RCOUNT to XDAC and the sign of the offset represented by RCOUNT to XDIR. Block 1212 transfers the values of XDAC to RDAC and the value of XDIR to RDIR to permit those new values to be applied to D/A converter 116 and direction control 128. The program then exits the ZERO subroutine at block 1194.

Figure 29:
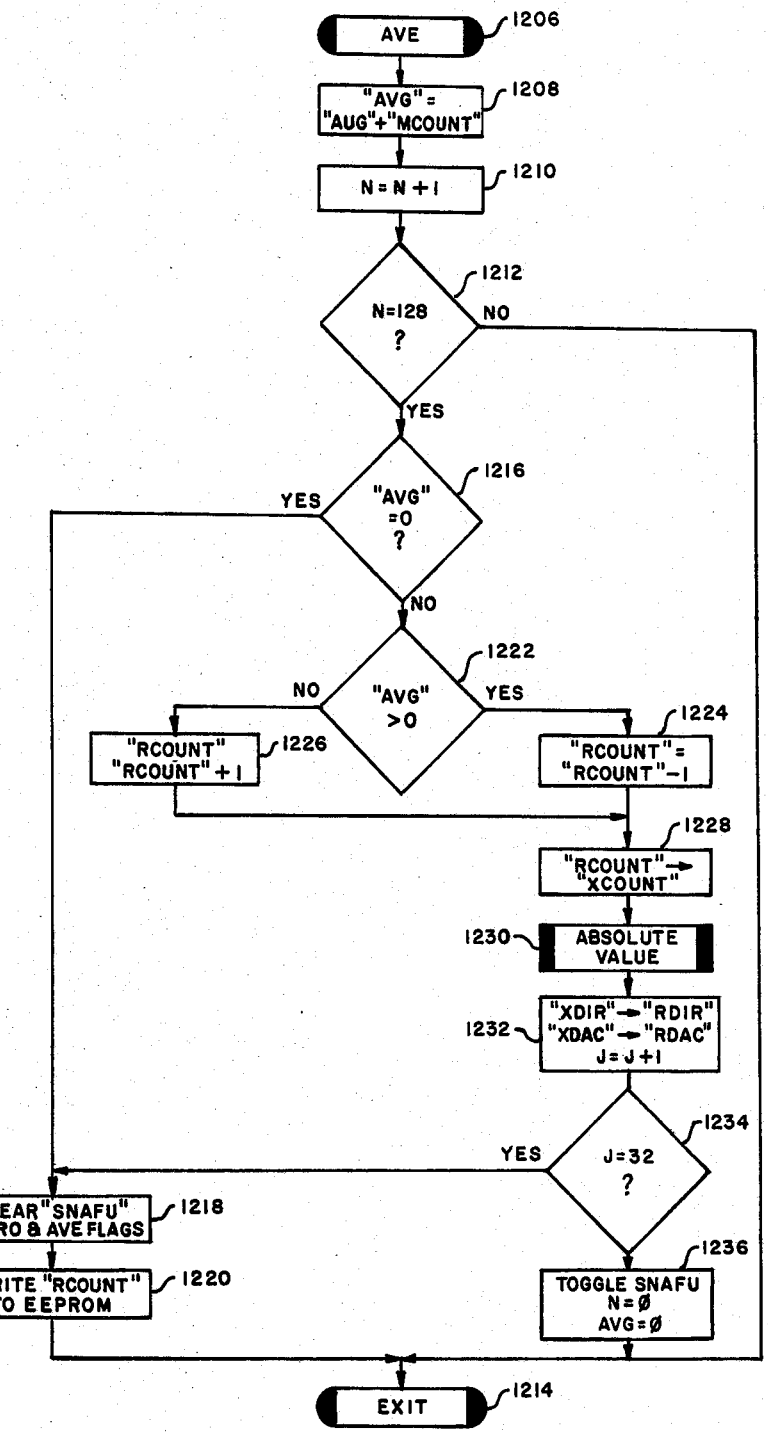

FIG. 29 shows the AVE subroutine. The AVE subroutine performs the fine adjustment of RCOUNT by averaging 128 consecutive values of MCOUNT and adjusting RCOUNT as the average is being calculated to attempt to force the average to zero. The program enters the AVE subroutine at block 1206. Block 1208 increases the value of AVG by the present value of MCOUNT. Block 1210 increases the value of N by one. The variable N is used to determine how many times AVG has been incremented by MCOUNT. Block 1212 determines whether N is equal to 128. If N is not equal to 128, a complete averaging operation has not been performed and the program exits the AVE subroutine at block 1214 to return to the MAIN routine and increment or decrement MCOUNT, as commanded by phase comparator 118. If N is equal to 128, one averaging operation has been completed and AVG contains a value equal to the sum of the 128 immediately preceding values of MCOUNT. Block 1216 determines the value of AVG. If AVG is equal to zero, the fine adjustment of RCOUNT has been completed and the value of RCOUNT now accurately reflects the zero flow offset of meter 10. Block 1218 clears SNAFU to indicate that the calculation of RCOUNT has been completed. Block 1218 also clears ZERO and AVE to ensure that the program will not execute the ZERO or AVE subroutines, but rather will execute the MASS subroutine on its next pass through the MAIN routine. Block 1220 writes the new value of RCOUNT to the RCOUNT EEPROM that has been assigned to store the value of RCOUNT. If block 1216 determines that AVG is not equal to zero, the averaging operation has not produced a satisfactory value for RCOUNT and block 1222 determines whether AVG is greater than zero. If AVG is greater than zero, the value of MCOUNT is still too high and RCOUNT is decremented to force MCOUNT, and the value of AVG that will be calculated during the next averaging operation, closer to zero. If AVG is not greater than zero, the value of MCOUNT has been too low and block 1226 increments RCOUNT to drive MCOUNT, and the average of MCOUNT over time, closer to zero. Block 1228 moves the value of RCOUNT to XCOUNT to prepare for the execution of the ABSOLUTE VALUE subroutine, to which the program is transferred at block 1230. The ABSOLUTE VALUE subroutine moves to XDIR a value that reflects the current sign of RCOUNT and moves to XDAC the current magnitude represented by RCOUNT. Block 1232 moves XDIR to RDIR and XDAC to RDAC to ensure that the appropriate signals pertaining to the latched count signal are applied to D/A converter 116 and direction control 128. Block 1232 also increments J by one. J is a variable used by the AVE subroutine to count the number of averaging operations the AVE subroutine has performed. Block 1234 determines whether J is equal to thirty-two. If J is equal to thirty-two, thirty-two averaging operations have been performed without yielding a value of zero for AVG. It is then assumed that, although AVG is not equal to zero, the value of MCOUNT over time under a zero flow condition is sufficiently close to zero to warrant foregoing the performance of any further averaging operations. Accordingly, the program is transferred to block 1218. If J is not equal to thirty-two, the AVE subroutine will perform another averaging operation. Block 1236 changes the state of SNAFU to indicate that the program is still calculating a new value for RCOUNT. Accordingly, if the signal on line 1016 alternates periodically between high and low, it can be assumed that the meter is still in the process of calculating a new zero flow offset. Block 1236 also sets N and AVG to zero to initialize those variables for the next averaging operation. The program exits the AVE subroutine through block 1214.

Figure 30:
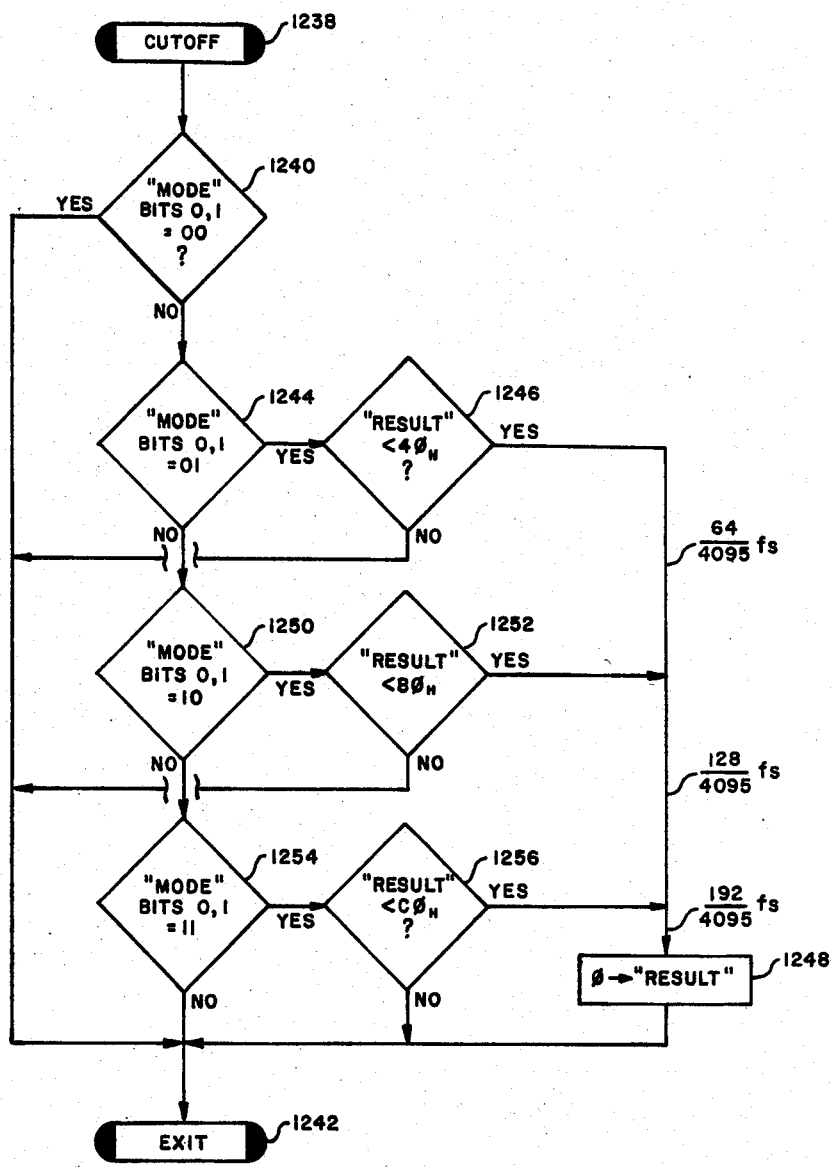

FIG. 30 shows the CUTOFF subroutine. Generally, the CUTOFF subroutine determines whether the value of RESULT has fallen below a threshold level and, therefore, is so low that meter 10 should output a zero mass flow rate. The CUTOFF subroutine permits the use of any one of three threshold levels. Each threshold level is (n/4095)fsr, where "fsr" is the full scale range of the system. Bits zero and one of MODE indicate whether the CUTOFF routine should be employed by the program and, if so, specify the threshold level, as follows:

| VALUE OF BIT ZERO, ONE | MODE |
| --- | --- |
| 0,0 | CUTOFF subroutine not requested |
| 0,1 | Cutoff subroutine requested, threshold level equal to $\frac{64}{4095} \times \text{fsr}$ |
| 1,0 | Cutoff subroutine requested, threshold level equal to $\frac{128}{4095} \times \text{fsr}$ |
| 1,1 | Cutoff subroutine requested, threshold level equal to $\frac{192}{4095} \times \text{fsr}$ |

The program enters the CUTOFF subroutine at block 1238. Block 1240 determines whether both bits zero and one of MODE are "0". If both bits zero and one are "0", the CUTOFF subroutine has not been requested and the program exits the CUTOFF subroutine at 1242. If bits zero and one are not both equal to "0", blocks 1244, 1250 and 1254 determine their values. If bit zero is "0" and bit one is "1", the threshold level is 64/4095 fsr and block 1244 transfers the program to block 1246, which determines whether RESULT is less than 40 (hexadecimal). If RESULT is less than 40 (hexadecimal), the value of RESULT falls below the threshold level and block 1248 transfers zeros to RESULT. If bit zero is "1" and bit one is "0", the threshold level is (128/4095) fsr and block 1250 transfers the program to block 1252, which determines whether RESULT is less than 80 (hexadecimal), in which case block 1248 assigns zeros to RESULT. If the value of RESULT is not less than 80 (hexadecimal), the program returns to the MASS subroutine. If both bits zero and one are "1", the threshold level is (192/4095) fsr, and block 1254 transfers the program to block 1256 which determines whether RESULT is less than C0 (hexadecimal). If RESULT is less than C0 (hexadecimal), RESULT falls below the threshold level and block 1248 transfers zeros to RESULT. If RESULT is not less than C0 (hexadecimal), the program returns to the MASS subroutine. If, for some reason, block 1245 determines that bits zero and one are not both "1", the program exits the CUTOFF subroutine and returns to the MASS subroutine.

What is claimed is:

1. A mass flow meter comprising:
   a conduit mounted at its ends to a support;
   means for vibrating said conduit;
   means for producing a pair of periodic electrical signals representative of a characteristic of the motion of said conduit at two predetermined points; and
   a system that provides an indication of the phase difference existing between the two periodic electrical signals comprising:
      means for producing a measurement comparison signal from a first of the periodic electrical signals and a measurement threshold signal, the phase difference between said measurement comparison signal and the first periodic signal depending on the level of said measurement threshold signal relative to the first periodic signal;
      means for generating a measurement characteristic signal, said measurement characteristic signal being related to the peak amplitude of the first periodic signal;
      means for creating a command signal, the nature of said command signal depending on whether said measurement comparison signal leads or lags a reference signal derived from the second periodic signal;
      means for accumulating a count signal, said command signals determining when the level of said count signal is increased and decreased; and
      means for combining a signal corresponding to said count signal and said measurement characteristic signal to produce said measurement threshold signal;
   whereby said count signal provides an indication of the phase difference existing between the periodic electrical signals and the rate of mass flow of matter flowing through said conduit.

2. The meter recited by claim 1 wherein said reference signal is said second periodic electrical signal.

3. A mass flow meter comprising:
   a conduit mounted at its ends to a support;
   means for vibrating said conduit;
   means for producing a pair of periodic electrical signals representative of a characteristic of the motion of said conduit at two predetermined points; and
   a system that provides an indication of the phase difference existing between the two periodic electrical signals comprising:
      means for producing a measurement comparison signal from a first of the periodic electrical signals and a measurement threshold signal, the phase difference between said measurement comparison signal and the first periodic signal depending on the level of said measurement threshold signal relative to the first periodic signal;
      means for generating a measurement characteristic signal, said measurement characteristic signal being related to the peak amplitude of the first periodic signal;
      means for creating a command signal, the nature of said command signal depending on whether said measurement comparison signal leads or lags a reference signal having a fixed phase;
      means for accumulating a count signal, said command signals determining when the level of said count signal is increased and decreased; and
      means for combining a signal corresponding to said count signal and said measurement characteristic signal to produce said measurement threshold signal;
   whereby said count signal provides an indication of the phase difference existing between the periodic electrical signals and the rate of mass flow of matter flowing through said conduit.

4. A mass flow meter comprising:
   a conduit mounted at its ends to a support;
   means for vibrating said conduit;
   means for producing a pair of periodic electrical signals representative of a characteristic of the motion of said conduit at two predetermined points;
   a system that provides an indication of the phase difference existing between two periodic electrical signals comprising:
      a pair of comparators, one said comparator being associated with each said electrical signal, each said comparator receiving as its inputs its associated said periodic electrical signal and an analog threshold signal, said comparator producing a periodic comparison signal, the phase difference between said comparison signal and the corresponding periodic electrical signal depending on the level of said threshold signal;
      a peak detector associated with each periodic electrical signal, each said peak detector having as its input its associated periodic electrical signal, said peak detector producing a peak signal representative of the peak level of each half cycle of its associated periodic electrical signal;
      a D/A converter associated with each peak detector, each said D/A converter having as its inputs the peak signal produced by its associated peak detector and a digital signal, said D/A converter multiplying said peak and digital signals to produce a said threshold signal for a said comparator;
      a phase comparator receiving as its inputs the said comparison signals produced by said comparators, said phase comparator producing a series of command signals, a said command signal being of a first type if, at the time of production of said command signal, a first said comparison signal leads the second said comparison signal, a said command signal being of a second type if, at the time of production of said command signal, said first comparison signal lags said second comparison signal; and means for accumulating a count signal, said accumulating means increasing said count signal if it receives a said command signal of said first type and decreasing said count signal if it receives a said command signal of said second type;

said count signal being provided to a first said D/A converter as its said digital signal;

whereby said count signal provides an indication of the phase difference existing between the periodic electrical signals, and the rate of flow of the mass through said conduit.

5. A mass flow meter comprising:

a support;

a conduit having a first section that defines an inlet connected to said support and an outlet, a second section that defines an outlet connected to said support and an inlet; and a third section that joins said outlet of said first section to said inlet of said second section, said conduit making a turn in a first direction at the juncture of said first section outlet and said third section and a turn in a second direction at the juncture of said third section and said second section inlet;

means for vibrating said conduit in a direction transverse to the longitudinal axis of said third section to provide an increasing gradient of transverse velocity of the flowing material between said first section inlet and said first section outlet, and, therefore, to produce a transverse force gradient on said conduit in a first direction, and to provide a decreasing gradient of transverse velocity of the flowing material between said second section inlet and said second section outlet, and therefore, to produce a transverse force gradient on said conduit in a second direction;

means for sensing the mechanical effect of said force gradients on said conduit, from which a pair of periodic signals related to the mass flow rate of the material travelling through said conduit can be provided;

a system that provides an indication of the phase difference between said pair of periodic electrical signals comprising:

comparison signal producing means for receiving said periodic signals and producing at least one periodic comparison signal, said comparison signal corresponding to a first said periodic electrical signal;

means for comparing said periodic comparison signal to a periodic reference signal derived from a second said periodic electrical signal and producing command signals, the nature of said command signals depending on the spatial relationship existing between said comparison signal and said reference signal; and accumulating means for accumulating a phase signal in response to receipt of said command signals, said accumulating means altering said phase signal in accordance with the nature of said command signals;

said comparison signal producing means reducing the phase difference between said reference signal and said comparison signal, in response to said alteration of said phase signal, to try to maintain a predetermined spatial relationship between said comparison and reference signals;

whereby said phase signal provides an indication of the phase difference existing between the periodic electrical signals when said predetermined spatial relationship has been reached.

6. A mass flow meter comprising:

a support;

a conduit having a first inlet section that defines an inlet connected to said support and an outlet, a second outlet section that defines an outlet connected to said support and an inlet, and a third section that joins said outlet of said first section to said inlet of said second section, said conduit including a first bend, at the juncture of said first and third sections, that causes a fluid stream flowing through said conduit to make a turn in a first direction, and a second bend, at the juncture of said second and third sections, that causes the fluid stream to make a turn in a different direction;

means for vibrating said conduit in a direction transverse to the longitudinal axis of said third section to provide an increasing gradient of transverse velocity of the flowing material between said first section inlet and said first section outlet, and, therefore, to produce a transverse force gradient on said conduit in a first direction, and to provide a decreasing gradient of transverse velocity of the flowing material between said second section inlet and said second section outlet, and, therefore, to produce a transverse force gradient on said conduit in a second direction;

means for producing a pair of periodic electrical signals relating to the magnitude of the force couple exerted on the conduit due to said transverse force gradients; and a system that provides an indication of the phase difference between the periodic electrical signals, comprising:

means for receiving said periodic signals and producing a comparison signal from at least a first said periodic electrical signal;

means for shifting said comparison signal to decrease to a predetermined magnitude the phase difference between said comparison signal and a reference signal corresponding to a second said periodic electrical signal;

means for monitoring and accumulating the angle through which said comparison signal is shifted to reduce said phase difference to said predetermined magnitude; whereby said accumulated angle provides an indication of the phase difference between the periodic electrical signals when the phase difference between said comparison and reference signals reaches said predetermined magnitude.

7. A mass flow meter comprising:

a support;

a conduit that defines an inlet and an outlet, said inlet and said outlet being mounted to said support, said conduit crossing a line joining the locations at which said conduit is mounted to said support;

means for vibrating said conduit in a direction transverse to the longitudinal axis of said third section to provide an increasing gradient of transverse velocity of the flowing material between said first section inlet and said first section outlet, and, therefore, to produce a transverse force gradient on said conduit in a first direction, and to provide a decreasing gradient of transverse velocity of the flowing material between said second section inlet and said second section outlet, and, therefore, to produce a transverse force gradient on said conduit in a second direction;

means for producing at least one periodic electrical signal relating to the magnitude of the force couple exerted on the conduit due to said transverse force gradients;

means for producing a periodic reference signal representative of a characteristic of the motion of said conduit at a predetermined point; and a system that provides an indication of the phase difference between two periodic electrical signals, comprising:

means for receiving said periodic electrical signal and producing a comparison signal therefrom;

means for shifting said comparison signal to decrease to a predetermined magnitude the phase difference between said comparison signal and said reference signal;

means for monitoring and accumulating the angle through which said comparison signal is shifted to reduce said phase difference to said predetermined magnitude;

whereby said accumulated angle provides an indication of the phase difference between said periodic electrical signal and said periodic reference signal when the phase difference between said signals reaches said predetermined magnitude.

* * * * *

CERTIFICATE OF CORRECTION

PATENT NO. : 4,655,089
DATED : April 7, 1987
INVENTOR(S) : Eric G. Kappelt and Frederick A. Ciccozzi It is certified that error appears in the above—identified patent and that said Letters Patent is hereby corrected as shown below:

Column 10, line 22, delete the occurrence of "26" and substitute therefor --126--;

Column 11, line 32, delete the occurrence of "30" and substitute therefor --130--;

Column 16, line 54, delete the occurrence of "." between "the" and "reference";

Column 26, line 50, delete "(1/f-conduit)" and substitute therefor --$(1/f_{conduit})$--;

Column 37, line 6, before "64/4095", insert --(--; and

Column 37, line 6, after "64/4095", insert --)--.

Signed and Sealed this

Seventeenth Day of May, 1988

*Attest:*

DONALD J. QUIGG

*Attesting Officer*  *Commissioner of Patents and Trademarks*